US007849475B2

(12) United States Patent
Covell et al.

(10) Patent No.: US 7,849,475 B2
(45) Date of Patent: *Dec. 7, 2010

(54) SYSTEM AND METHOD FOR SELECTIVE RECORDING OF INFORMATION

(75) Inventors: Michele Mae Covell, Los Altos Hills, CA (US); M. Margaret Withgott, Los Altos Hills, CA (US)

(73) Assignee: Interval Licensing LLC, Seattle, WA (US)

( * ) Notice: Subject to any disclaimer, the term of this patent is extended or adjusted under 35 U.S.C. 154(b) by 970 days.

This patent is subject to a terminal disclaimer.

(21) Appl. No.: 10/888,800

(22) Filed: Jul. 8, 2004

(65) Prior Publication Data

US 2008/0127240 A1    May 29, 2008

Related U.S. Application Data

(63) Continuation of application No. 08/771,947, filed on Dec. 23, 1996, now Pat. No. 6,782,186, which is a continuation of application No. 08/399,482, filed on Mar. 7, 1995, now abandoned.

(51) Int. Cl.
H04N 7/16   (2006.01)
(52) U.S. Cl. .......................................... 725/22; 725/28
(58) Field of Classification Search .................. 725/22, 725/28; 348/571; 358/908; 360/5, 60, 69; 386/1, 46; H04N 7/16
See application file for complete search history.

(56) References Cited

U.S. PATENT DOCUMENTS

| 3,884,403 A | 5/1975 | Brewer |
| 3,919,475 A | 11/1975 | Dukich et al. |
| 4,033,335 A | 7/1977 | Nickles |
| 4,033,488 A | 7/1977 | Brewer |
| 4,051,534 A | 9/1977 | Dukich et al. |
| 4,131,919 A | 12/1978 | Lloyd et al. |
| 4,217,609 A | 8/1980 | Hatori et al. |

(Continued)

FOREIGN PATENT DOCUMENTS

DE    4408131    7/1995

(Continued)

OTHER PUBLICATIONS

U.S. Appl. No. 12/264,414, filed Nov. 4, 2008, Bhadkamkar et al.

(Continued)

Primary Examiner—Young Lee
(74) Attorney, Agent, or Firm—Perkins Coie LLP

(57) ABSTRACT

A system and method for selective recording of information uses sequential pattern matching of statistical vectors which characterize incoming time-based information to identify previously marked information within an incoming information stream. The system and method generate a signal to control a recording device to either elide the previously marked information from the recording, or to begin recording once the previously marked information is identified, depending upon the current mode of operation. The system and method may be utilized to omit recording of unwanted information, such as commercials in a television broadcast, or to automatically locate desired information on any of a number of available information channels without a priori knowledge of the occurrence time or channel of the information.

12 Claims, 9 Drawing Sheets

U.S. PATENT DOCUMENTS

| | | |
|---|---|---|
| 4,260,229 A | 4/1981 | Bloomstein |
| 4,283,735 A | 8/1981 | Jagger |
| 4,319,286 A | 3/1982 | Hanpachern |
| 4,380,024 A | 4/1983 | Olofsson et al. |
| 4,390,904 A | 6/1983 | Johnston et al. |
| 4,446,997 A | 5/1984 | Himberg |
| 4,520,404 A | 5/1985 | Von Kohorn |
| 4,524,381 A | 6/1985 | Konishi et al. |
| 4,526,308 A | 7/1985 | Dovey |
| 4,527,201 A | 7/1985 | Cappels |
| 4,536,066 A | 8/1985 | Bauer et al. |
| 4,574,354 A | 3/1986 | Mihalik et al. |
| 4,602,297 A | 7/1986 | Reese |
| 4,605,964 A | 8/1986 | Chard et al. |
| 4,605,973 A | 8/1986 | Von Kohorn |
| 4,618,895 A | 10/1986 | Wright |
| 4,714,184 A | 12/1987 | Young et al. |
| 4,739,398 A | 4/1988 | Thomas et al. |
| 4,750,052 A | 6/1988 | Poppy et al. |
| 4,750,053 A | 6/1988 | Allen |
| 4,777,537 A | 10/1988 | Ueno et al. |
| 4,782,401 A | 11/1988 | Faerber et al. |
| 4,814,876 A | 3/1989 | Horio et al. |
| 4,827,532 A | 5/1989 | Bloomstein |
| 4,837,817 A | 6/1989 | Maemori et al. |
| 4,841,575 A | 6/1989 | Welsh et al. |
| 4,843,484 A | 6/1989 | Kanamaru et al. |
| 4,847,543 A | 7/1989 | Fellinger |
| 4,913,539 A | 4/1990 | Lewis |
| 4,930,160 A | 5/1990 | Vogel |
| 4,934,821 A | 6/1990 | Morton |
| 4,989,104 A | 1/1991 | Schulein et al. |
| 5,012,334 A | 4/1991 | Etra |
| 5,012,335 A | 4/1991 | Cohodar |
| 5,025,394 A | 6/1991 | Parke |
| 5,038,217 A | 8/1991 | Hayashi et al. |
| 5,040,081 A | 8/1991 | McCutchen |
| 5,109,482 A | 4/1992 | Bohrman |
| 5,136,655 A | 8/1992 | Bronson |
| 5,146,353 A | 9/1992 | Isoguchi et al. |
| 5,157,742 A | 10/1992 | Niihara et al. |
| 5,172,281 A | 12/1992 | Ardis et al. |
| 5,175,769 A | 12/1992 | Hejna, Jr. et al. |
| 5,177,796 A | 1/1993 | Feig et al. |
| 5,179,449 A | 1/1993 | Doi et al. |
| 5,182,641 A | 1/1993 | Diner et al. |
| 5,185,667 A | 2/1993 | Zimmermann |
| 5,187,571 A | 2/1993 | Braun et al. |
| 5,226,093 A | 7/1993 | Iwase et al. |
| 5,239,428 A | 8/1993 | Nishida et al. |
| 5,241,428 A | 8/1993 | Goldwasser et al. |
| 5,249,289 A | 9/1993 | Thamm et al. |
| 5,253,061 A | 10/1993 | Takahama et al. |
| 5,253,066 A | 10/1993 | Vogel |
| 5,262,856 A | 11/1993 | Lippman et al. |
| 5,265,180 A | 11/1993 | Golin |
| 5,267,042 A | 11/1993 | Tsuchiya et al. |
| 5,295,089 A | 3/1994 | Ambasz |
| 5,299,019 A | 3/1994 | Pack et al. |
| 5,305,400 A | 4/1994 | Butera et al. |
| 5,317,730 A | 5/1994 | Moore et al. |
| 5,329,320 A | 7/1994 | Yifrach et al. |
| 5,333,091 A | 7/1994 | Iggulden et al. |
| 5,343,251 A | 8/1994 | Nafeh |
| 5,377,051 A | 12/1994 | Lane et al. |
| 5,384,703 A | 1/1995 | Withgott et al. |
| 5,396,287 A | 3/1995 | Cho et al. |
| 5,396,583 A | 3/1995 | Chen et al. |
| 5,404,316 A | 4/1995 | Klingler et al. |
| 5,406,626 A | 4/1995 | Ryan |
| 5,416,310 A | 5/1995 | Little |
| 5,420,801 A | 5/1995 | Dockter et al. |
| 5,421,031 A | 5/1995 | De Bey et al. |
| 5,428,774 A | 6/1995 | Takahashi et al. |
| 5,430,835 A | 7/1995 | Williams et al. |
| 5,436,542 A | 7/1995 | Petelin et al. |
| 5,436,653 A | 7/1995 | Ellis et al. |
| 5,438,357 A | 8/1995 | McNelley |
| 5,438,362 A | 8/1995 | Tabuchi et al. |
| 5,438,423 A | 8/1995 | Lynch et al. |
| 5,444,478 A | 8/1995 | Lelong et al. |
| 5,467,271 A | 11/1995 | Abel et al. |
| 5,467,288 A | 11/1995 | Fasciano et al. |
| 5,473,379 A | 12/1995 | Horne |
| 5,477,331 A | 12/1995 | Yamaguchi et al. |
| 5,486,852 A | 1/1996 | Arai et al. |
| 5,488,409 A | 1/1996 | Yuen et al. |
| 5,510,830 A | 4/1996 | Ohia et al. |
| 5,514,861 A | 5/1996 | Swartz et al. |
| 5,524,051 A | 6/1996 | Ryan |
| 5,524,193 A | 6/1996 | Covington et al. |
| 5,528,282 A | 6/1996 | Voeten et al. |
| 5,537,151 A | 7/1996 | Orr et al. |
| 5,537,530 A | 7/1996 | Edgar et al. |
| 5,539,483 A | 7/1996 | Nalwa |
| 5,546,145 A | 8/1996 | Bernardi et al. |
| 5,550,754 A | 8/1996 | McNelley et al. |
| 5,555,463 A | 9/1996 | Staron et al. |
| 5,572,261 A | 11/1996 | Cooper |
| 5,575,443 A | 11/1996 | Honeycutt |
| 5,583,565 A | 12/1996 | Cortjens et al. |
| 5,583,571 A | 12/1996 | Friedland |
| 5,583,652 A | 12/1996 | Ware |
| 5,590,195 A | 12/1996 | Ryan |
| 5,592,626 A | 1/1997 | Papadimitriou et al. |
| 5,594,498 A | 1/1997 | Fraley |
| 5,598,352 A | 1/1997 | Rosenau et al. |
| 5,604,551 A | 2/1997 | Choi et al. |
| 5,606,359 A | 2/1997 | Youden et al. |
| 5,608,839 A | 3/1997 | Chen |
| 5,612,742 A | 3/1997 | Krause et al. |
| 5,613,032 A | 3/1997 | Cruz et al. |
| 5,613,909 A | 3/1997 | Stelovsky |
| 5,614,940 A | 3/1997 | Cobbley et al. |
| 5,623,173 A | 4/1997 | Fasullo et al. |
| 5,635,982 A | 6/1997 | Zhang et al. |
| 5,664,227 A | 9/1997 | Mauldin et al. |
| 5,666,159 A | 9/1997 | Parulski et al. |
| 5,671,014 A | 9/1997 | Ito et al. |
| 5,678,793 A | 10/1997 | Hill |
| 5,682,597 A | 10/1997 | Ganek et al. |
| 5,684,514 A | 11/1997 | Branscomb |
| 5,687,095 A | 11/1997 | Haskell et al. |
| 5,689,300 A | 11/1997 | Shibata et al. |
| 5,689,648 A | 11/1997 | Diaz et al. |
| 5,692,213 A | 11/1997 | Goldberg et al. |
| 5,692,661 A | 12/1997 | Kellerman |
| 5,694,474 A | 12/1997 | Ngo et al. |
| 5,701,582 A | 12/1997 | DeBey et al. |
| 5,703,655 A | 12/1997 | Corey et al. |
| 5,703,795 A | 12/1997 | Mankovitz |
| 5,713,021 A | 1/1998 | Kondo et al. |
| 5,717,814 A | 2/1998 | Abecassis |
| 5,717,869 A | 2/1998 | Moran et al. |
| 5,721,823 A | 2/1998 | Chen et al. |
| 5,724,646 A | 3/1998 | Ganek et al. |
| 5,726,660 A | 3/1998 | Purdy et al. |
| 5,726,717 A | 3/1998 | Peters et al. |
| 5,729,108 A | 3/1998 | Steele et al. |
| 5,729,741 A | 3/1998 | Liaguno et al. |
| 5,737,009 A | 4/1998 | Payton |
| 5,740,037 A | 4/1998 | McCann et al. |
| 5,742,339 A | 4/1998 | Wakui et al. |
| 5,742,517 A | 4/1998 | Van Den Bosch |

| | | | |
|---|---|---|---|
| 5,749,010 A | 5/1998 | McCumber |
| 5,751,336 A | 5/1998 | Aggarwal et al. |
| 5,751,806 A | 5/1998 | Ryan |
| 5,752,113 A | 5/1998 | Borden |
| 5,754,230 A | 5/1998 | Tsuruta et al. |
| 5,758,181 A | 5/1998 | Becker |
| 5,765,133 A | 6/1998 | Antoniol et al. |
| 5,768,640 A | 6/1998 | Takahashi et al. |
| 5,768,648 A | 6/1998 | Skipp et al. |
| 5,774,498 A | 6/1998 | Oya et al. |
| 5,774,664 A | 6/1998 | Hidary et al. |
| 5,778,181 A | 7/1998 | Hidary et al. |
| 5,791,907 A | 8/1998 | Ramshaw et al. |
| 5,793,367 A | 8/1998 | Taguchi et al. |
| 5,793,971 A | 8/1998 | Fujita et al. |
| 5,796,426 A | 8/1998 | Gullichsen et al. |
| 5,805,156 A | 9/1998 | Richmond et al. |
| 5,809,161 A | 9/1998 | Auty et al. |
| 5,818,439 A | 10/1998 | Nagasaka et al. |
| 5,818,510 A | 10/1998 | Cobbley et al. |
| 5,822,493 A | 10/1998 | Uehara et al. |
| 5,826,206 A | 10/1998 | Nemeth |
| 5,828,994 A | 10/1998 | Covell et al. |
| 5,831,662 A | 11/1998 | Payton |
| 5,835,667 A | 11/1998 | Wactlar et al. |
| 5,838,874 A | 11/1998 | Ngo et al. |
| 5,844,693 A | 12/1998 | Miyata et al. |
| 5,870,143 A | 2/1999 | Suzuki et al. |
| 5,880,788 A | 3/1999 | Bregler |
| 5,884,141 A | 3/1999 | Inoue et al. |
| 5,886,739 A | 3/1999 | Winningstad |
| 5,892,536 A | 4/1999 | Logan et al. |
| 5,893,062 A | 4/1999 | Bhadkamkar et al. |
| 5,917,542 A | 6/1999 | Moghadam et al. |
| 5,929,904 A | 7/1999 | Uchida et al. |
| 5,936,659 A | 8/1999 | Viswanathan et al. |
| 5,940,004 A | 8/1999 | Fulton |
| 5,946,050 A | 8/1999 | Wolff |
| 5,974,235 A | 10/1999 | Nunally et al. |
| 5,982,979 A | 11/1999 | Omata et al. |
| 5,999,173 A | 12/1999 | Ubillos |
| 6,005,564 A | 12/1999 | Ahmad et al. |
| 6,009,204 A | 12/1999 | Ahmad |
| 6,018,359 A | 1/2000 | Kermode et al. |
| 6,020,883 A | 2/2000 | Herz et al. |
| 6,025,837 A | 2/2000 | Matthews, III et al. |
| 6,041,142 A | 3/2000 | Rao et al. |
| 6,061,055 A | 5/2000 | Marks |
| 6,061,056 A | 5/2000 | Menard et al. |
| 6,069,621 A | 5/2000 | Schupak |
| 6,072,542 A | 6/2000 | Wilcox et al. |
| 6,081,551 A | 6/2000 | Etoh et al. |
| 6,118,925 A | 9/2000 | Murata et al. |
| 6,141,693 A | 10/2000 | Perlman et al. |
| 6,160,950 A | 12/2000 | Shimazaki et al. |
| 6,172,675 B1 | 1/2001 | Ahmad et al. |
| 6,212,657 B1 | 4/2001 | Wang et al. |
| 6,236,395 B1 | 5/2001 | Sezan et al. |
| 6,240,555 B1 | 5/2001 | Shoff et al. |
| 6,243,725 B1 | 6/2001 | Hempleman et al. |
| 6,259,817 B1 | 7/2001 | Ahmad |
| 6,263,507 B1 | 7/2001 | Ahmad et al. |
| 6,266,085 B1 | 7/2001 | Kato |
| 6,272,231 B1 | 8/2001 | Maurer et al. |
| 6,282,362 B1 | 8/2001 | Murphy et al. |
| 6,297,845 B1 | 10/2001 | Kuhn et al. |
| 6,351,599 B1 | 2/2002 | Komeno et al. |
| 6,360,202 B1 | 3/2002 | Bhadkamkar et al. |
| 6,360,234 B2 | 3/2002 | Jain et al. |
| 6,366,296 B1 | 4/2002 | Boreczky et al. |
| 6,377,519 B1 | 4/2002 | Lee et al. |
| 6,385,386 B1 | 5/2002 | Aotake et al. |
| 6,404,811 B1 | 6/2002 | Cvetko et al. |
| 6,452,969 B1 | 9/2002 | Yim |
| 6,502,139 B1 | 12/2002 | Birk et al. |
| 6,563,532 B1 | 5/2003 | Strub et al. |
| 6,622,305 B1 | 9/2003 | Willard |
| 6,624,846 B1 | 9/2003 | Lassiter |
| 6,690,273 B2 | 2/2004 | Thomason |
| 6,701,528 B1 | 3/2004 | Arsenault et al. |
| 6,704,750 B2 | 3/2004 | Asazu et al. |
| 6,728,678 B2 | 4/2004 | Bhadkamkar et al. |
| 6,782,186 B1 | 8/2004 | Covell et al. |
| 6,825,875 B1 | 11/2004 | Strub et al. |
| 6,880,171 B1 | 4/2005 | Ahmad et al. |
| 6,901,209 B1 | 5/2005 | Cooper et al. |
| 6,934,461 B1 | 8/2005 | Strub et al. |
| 6,961,954 B1 | 11/2005 | Maybury et al. |
| 6,993,787 B1 | 1/2006 | Kamel et al. |
| 7,072,575 B2 | 7/2006 | Kang et al. |
| 7,130,528 B2 | 10/2006 | Blair et al. |
| 7,143,431 B1 | 11/2006 | Eager et al. |
| 7,155,735 B1 | 12/2006 | Ngo et al. |
| 7,194,186 B1 | 3/2007 | Strub et al. |
| 7,266,771 B1 | 9/2007 | Tow et al. |
| 7,340,760 B2 | 3/2008 | Wachtfogel et al. |
| 7,454,777 B1 | 11/2008 | Nishikawa et al. |
| 7,519,271 B2 | 4/2009 | Strub et al. |
| 2002/0006266 A1 | 1/2002 | Yoon et al. |
| 2002/0013949 A1 | 1/2002 | Hejna |
| 2002/0031331 A1 | 3/2002 | Kwoh et al. |
| 2002/0073105 A1 | 6/2002 | Noguchi et al. |
| 2002/0120925 A1 | 8/2002 | Logan |
| 2002/0157103 A1 | 10/2002 | Song et al. |
| 2002/0159750 A1 | 10/2002 | Jasinschi et al. |
| 2002/0170068 A1 | 11/2002 | Rafey et al. |
| 2003/0043194 A1 | 3/2003 | Lif |
| 2003/0093790 A1 | 5/2003 | Logan et al. |
| 2003/0149574 A1 | 8/2003 | Rudman |
| 2003/0163824 A1 | 8/2003 | Gordon et al. |
| 2004/0022313 A1 | 2/2004 | Kim |
| 2004/0078812 A1 | 4/2004 | Calvert |
| 2004/0123324 A1 | 6/2004 | Sazzad et al. |
| 2004/0170385 A1 | 9/2004 | Bhadkamkar |
| 2005/0183127 A1 | 8/2005 | Ngo et al. |
| 2006/0031879 A1 | 2/2006 | Colter |
| 2006/0031885 A1 | 2/2006 | Colter |
| 2006/0031916 A1 | 2/2006 | Colter |
| 2006/0053470 A1 | 3/2006 | Colter et al. |
| 2007/0204319 A1 | 8/2007 | Ahmad et al. |

FOREIGN PATENT DOCUMENTS

| | | |
|---|---|---|
| EP | 179701 A1 | 4/1986 |
| EP | 0513601 | 11/1992 |
| EP | 0674315 A1 | 9/1995 |
| EP | 0689362 A2 | 12/1995 |
| GB | 2231246 | 11/1990 |
| JP | A H01-174192 | 7/1989 |
| JP | 06162166 | 6/1994 |
| WO | WO-9715926 | 5/1997 |

OTHER PUBLICATIONS

"Correlating Audio and Moving-Image Tracks," IBM Technical Disclosure Bulletin, vol. 33, No. 10A, Mar. 1991, pp. 295-296.

"VideoLogger® SDK: Virage Open Architecture," Datasheet, Virage, Inc., San Mateo, California, 2003, 2 pages.

"VideoLogger®: Automate Video Encoding and Indexing," Datasheet, Virage, Inc., San Mateo, California, 2003, 3 pages.

Arons, B., "Techniques, Perception, and Applications of Time-Compressed Speech," Proceedings of 1992 Conference, American Voice I/O Society, Sep. 1992, 19 pages.

Brooks et al., "Computer Graphics Animations of Talking Faces Based on Stochastic Models," ISSIPNN '94, 1994 International Symposium on Speech, Image Processing and Neural Networks, Proceedings, vol. 1, Apr. 1994, pp. 73-76.

Gemperle et al., "Design for Wearability," IEEE, 1998, pp. 116-122.

Non-Final Office Action for U.S. Appl. No. 11/682,201, Mail Date Apr. 3, 2009, 30 pages.

U.S. Appl. No. 12/463,923, filed May 11, 2009, Colter.

Buckley et al., "The Effect of Adding Relevance Information in a Relevance Feedback Environment," Proceedings of the 17th Annual Conference on Research and Development in Information Retrieval, Jul. 3-6, 1994, pp. 292-300.

Carter, S. et al., "Improving Video-on Demand Server Efficiency Through Stream Tapping," 1997 IEEE, pp. 200-207.

Carter, S. et al., "Video-on-Demand Broadcasting Protocols," pp. 1-25.

Chen, T. et al, "Lip synchronization in talking head video utilizing speech information," SPIE, Visual Communications and Image Processing '95, vol. 2501, May 1995, pp. 1690-1701.

CNN at Work White Paper, 1994, 22 pages.

Covell et al, "Spanning the Gap between Motion Estimation and Morphing," Proceedings of the IEEE International Conference on Acoustics, Speech and Signal Processing, Apr. 19-22, 1994, Adelaide, Australia, http://www.mangolassi.org/cove11/1994-010/, 8 pages [Internet Accessed on Jul. 11, 2008].

Elliott, E., "Multiple Views of Digital Video," MIT Media Laboratory, Interactive Cinema Group, Mar. 23, 1992, 4 pages.

Elliott, E., "Watch, Grab, Arrange, See: Thinking with Motion Images via Streams and Collages," Masters thesis, School of Architecture and Planning, Massachusetts Institute of Technology, Feb. 1993, pp. 3, 5, 7, 10-11, 13-35, 37-49, 51-61, 63-85,87-99, 101, 103-105.

Hauptman et al., "Speech for Multimedia Information Retrieval," UIST '95(ACM), Nov. 14, 1995, pp. 79-80.

Hauptmann et al., "Text, Speech, and Vision for Video Segmentation: The Informedia™ Project," AAAI Fall Symposium, Computational Models for Integrating Language and Vision, Nov. 10-12, 1995, 12 pages.

Henton, C. et al, "Saying and Seeing It With Feeling: Techniques For Synthesizing Visible, Emotional Speech," SSW2-1994, pp. 73-76.

Horner, C., "NewsTime: A Graphical User Interface to Audio News," Masters Thesis, School of Architecture and Planning, Massachusetts Institute of Technology, Jun. 1993, pp. 1-84.

Huttenlocher et al., "Tracking Non-Rigid Objects in Complex Scenes," IEEE International Conference on Computer Vision, 1993, pp. 93-101.

Lindblad et al., "ViewStation Applications: Implications for Network Traffic," IEEE Journal on Selected Areas in Communications, vol. 13, No. 5, Jun. 1995, pp. 768-777, New York, NY, US.

Moulines et al., "Non-parametric techniques for pitch-scale and time-scale modification of speech," Speech Communication, vol. 16, 1995, pp. 175-205.

Paris et al., "A Low Bandwidth Broadcasting Protocol for Video on Demand," IC3N '98, Oct. 1998, pp. 640-647.

Rabiner, A Tutorial on Hidden Markov Models and Selected Applications in Speech Recognition, Proceedings of the IEEE, vol. 77, No. 2, Feb. 1989, pp. 257-285.

Reynolds, D., "A Gaussian Mixture Modeling Approach to Text-Independent Speaker Identification," Ph.D. Thesis, Dept. of Electrical Engineering, Georgia Institute of Technology, Aug. 1992, pp. 1-154.

Roucos et al., "High Quality Time-Scale Modification for Speech," Proceedings of the International Conference on Acoustics, Speech, and Signal Processing, IEEE, 1985, pp. 493-496.

Sakauchi et al., "Multimedia Database Systems for the Contents Mediator," IEICE Trans. Inf. and Syst., vol. E79-D, No. 6, Jun. 1996, pp. 641-646.

Salton et al., "Improving Retrieval Performance by Relevance Feedback," Journal of the American Society for Information Science, vol. 41, No. 4, Jun. 1990, pp. 288-297.

Scott et al, "Synthesis of Speaker Facial Movement to Match Selected Speech Sequences," Speech Science and Technology '94, Dec. 5-8, Perth, Australia, 6 pages.

Shahraray et al., "Automatic generation of pictoral transcripts of video programs," SPIE, vol. 2417, Jan. 1995, pp. 512-518.

Shibata M., "A Description Model of Video Content and Its Application for Video Structuring," Systems and Computers in Japan, vol. 27, No. 7, Jun. 1996, pp. 70-83.

Tennenhouse et al., "The ViewStation: a software-intensive approach to media processing and distribution," Proceedings of the 17th Annual Conference on Research and Development in Information Retrieval, Jul. 3-6, 1994, pp. 104-115.

Wactlar et al., "Intelligent Access to Digital Video: Informedia Project," Computer, vol. 29, No. 5, May 1996, pp. 46-52.

Welsh et al., "Facial-Feature Image Coding Using Principal Components," Electronics Letters, vol. 28, No. 22, Oct. 1992, pp. 2066-2067.

Yeung et al., "Efficient Matching and Clustering of Video Shots," IEEE '95 (ICIP), vol. 1, Oct. 1995, pp. 338-341.

Zabih et al., "A Real-Time System for Automatically Annotating Unstructured Image Sequences," IEEE International Conference on Systems, Man, and Cybernetics, 1993, 6 pages.

Zhang et al., "Automatic Parsing of News Video," IEEE Conference on Multimedia Computing and Systems, 1994, pp. 45-54.

U.S. Appl. No. 10/764,309, filed Jul. 8, 2004, Strub et al.

"Evolution of Steve Mann's 'existential computer'," 'Personal Imaging', IEEE Computer Society, http://computer.org/pubs/computer/1997/0297loc.htm, 1 page.

"Informedia: Experience on Demand," DARPA/ITO Joint IC and V/IM Principal Investigator Meeting, Oct. 15-17, 1997, 2 pages.

Chen et al., "The Use of Emphasis to Automatically Summarize a Spoken Discourse," 1992 IEEE International Conference on Acoustics, Speech and Signal Processing, Mar. 23-26, 1992, pp. I-229 and I-232.

Virtual Tech, "Thousands of NEW Products are introduced every year by hundreds of companies . . . ," Toyoda Machinery USA, believed to be in use in Japan in 1998, 2 pages.

Flanagan et al., "Computer-steered microphone arrays for sound transduction in large rooms," J. Acoust. Soc. Am. 78 (5), Nov. 1985, pp. 1508-1518.

Forsyth et al., "Searching for Digital Pictures," Scientific American, Jun. 1997, 7 pgs.

Froba et al., "Multi-Sensor Biometric Person Recognition in an Access Control System," Proceedings Second International Conference on Audio- and Video-Based Biometric Person Authentication, Mar. 22-23, 1999, Washington, D.C., pp. 55-59.

Frost III, Otis L., "An Algorithm for Linearly Constrained Adaptive Array Processing," Proceedings of the IEEE, vol. 60, No. 8, Aug. 1972, pp. 926-935.

Good Guys Circular, "JVC Compact Super-VHS Modular Component Video System," Nov. 1991 or 1992, 1 page.

Grenier, Yves, "A microphone array for car environments," Speech Communication, vol. 12, No. 1, Mar. 1993, pp. 25-39.

Haeberli et al., "Automatic Panoramic Image Merging," Grafica Obscura, http://www.sgi.com/grafica/merge/index.html, 1998, 2 pages.

Hall, Allan, "A new spin on power dressing," Associated Newspapers Ltd., Sep. 14, 1999.

Healey et al., "Quantifying Driver Stress: Developing a System for Collecting and Processing Bio-Metric Signals in Natural Situations," Proceedings of the Rocky Mountain Bio-Engineering Symposium, Apr. 16-18, 1999, pp. 1-6.

Healey et al., "StartleCam: A Cybernetic Wearable Camera," Second International Symposium on Wearable Computers, Oct. 19-20, 1998, pp. 42-49.

Kelly et al., "An Architecture for Multiple Perspective Interactive Video," Multimedia 1995, pp. 201-212.

Mann et al., "Video Orbits of the Projective Group: A simple approach to featureless estimation of parameters," IEEE Trans. Image Proc., Jul. 1997, pp. 1-31.

Mann et al., "Virtual Bellows: Constructing High Quality Stills from Video," IEEE, 1994, pp. 363-367.

Phillips et al., "The FERET Evaluation," Face Recognition: From Theory to Applications, 1998, pp. 244-261.

Product description for SMPTE Time Code Products for GPS Video Position Logging, Horita Co., Inc., Viejo, California, 1998, 1 page.

Product description for Studio Master Time Code and Sync Generators, Horita Co., Inc., Viejo, California, 1998, 1 page.

Rosenberg et al., "Recent Research in Automatic Speaker Recognition," Advances in Speech Signal Processing, 1992, pp. 701-738.

Scheirer et al., "Construction and Evaluation of a Robust Multifeature Speech/Music Discriminator," Proc. ICASSP-1997, Apr. 21-24, Munich, Germany, pp. 1-4.

Senior, Andrew, "Face and feature finding for a face recognition system," Proceedings Second International Conference on Audio- and Video-based Biometric Person Authentication, Mar. 22-23, 1999, Washington, D.C., pp. 154-159.

Slaney et al., "Baby Ears: A Recognition System for Affective Vocalizations," Proceeding of the 1998 International Conference on Acoustics, Speech, and Signal Processing (ICASSP), Seattle, WA, May 12-15, 1998, pp. 1-4.

Sony, ClipLink Guide, pp. 9-14, 1996.

Sony, Digital Camcorder Operating Instructions, pp. 65-71, 1998.

Szeliski et al., "Creating Full View Panoramic Image Mosaics and Environment Maps," Computer Graphics Proceedings, Annual Conference Series, 1997, pp. 251-258.

Szeliski, R., "Video Mosaics for Virtual Environments," IEEE Computer Graphics and Applications, Mar. 1996, pp. 22-30.

Supercircuits Microvideo Catalog, GC1 Professional Grade Color Covert Glasses Cam, 1998, 1 page.

La Lunette Camera—Alain Mikli, http://www.mikli.fr/eng/Actualites/Lcamera/Lcamera.htm?Nav=1, La Lunette Camera Sunglasses, Jul. 27, 1998, 1 page.

"About Gitzo," http://www.gitzo.com/en/company.htm, Gitzo S.A. Ball Head Camera Mounts, 4 pgs., Mar. 11, 1999.

"Covert Video/Audio Sunglasses," From Rock House Products, http://www.rock2000.com/nanny/glasses.htm, Dec. 9, 1998, 2 pages.

Velbon.com, "CX Series Photo Tripods," and "DF-Series 'Dual Function' Photo/Video Tripods," 3 pgs. [internet accesses on Apr. 13, 1999].

1998 Everest Expedition: Technology, http://www.everest.org/Everest/tech.html, Datacam Technology, Jul. 31, 1998, 2 pgs.

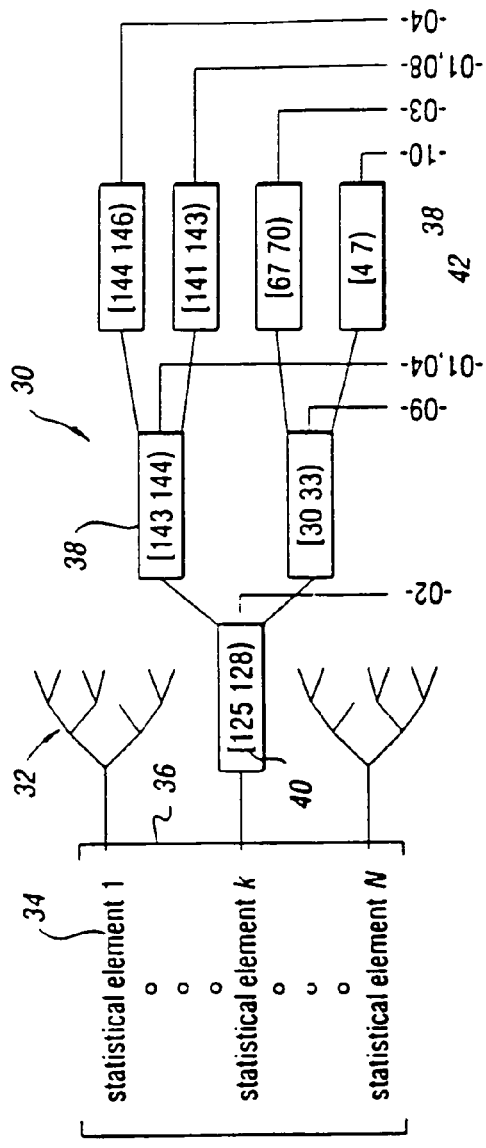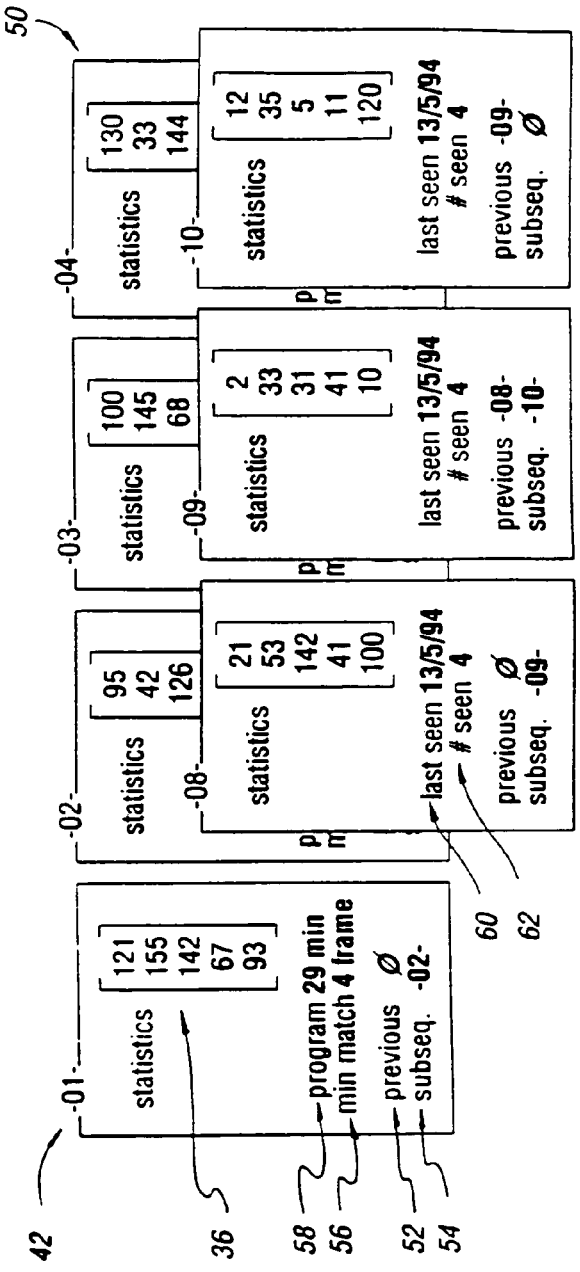
Fig. 2a
Fig. 2b

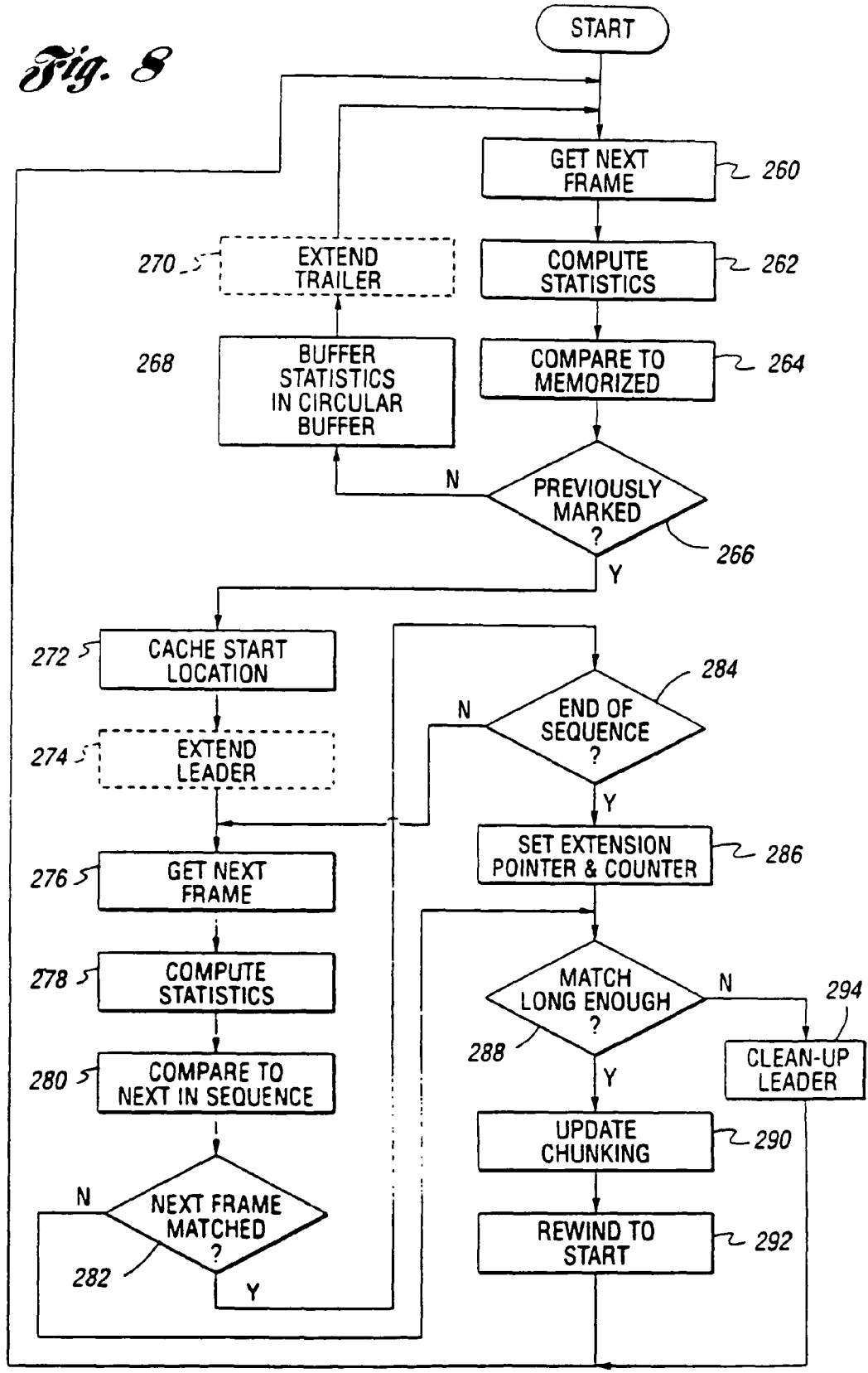

SYSTEM AND METHOD FOR SELECTIVE RECORDING OF INFORMATION

This is a Continuation of application Ser. No. 08/771,947, filed Dec. 23, 1996, now U.S. Pat. No. 6,782,186 which is a continuation of application Ser. No. 08/399,482, filed Mar. 7, 1995, now abandoned, which is hereby incorporated by reference.

TECHNICAL FIELD

The present invention relates to a system and method for selective recording of various types of information.

BACKGROUND ART

The explosion of information now available relating to a wide variety of topics ranging from business to entertainment has driven the development of technology capable of providing this information to various selected groups and individuals. Once the information is conveyed from a source to a destination, the information is often categorized and stored either by individuals or by service organizations for subsequent retrieval of selected information.

Regardless of the particular form of received information, or the character of the storage media, it is often desirable to identify information of interest and extract that information from the incoming data stream for subsequent storage. This procedure optimizes the use of the storage media while also increasing the efficiency of the user in assimilating the information. Thus, the user interested in ascertaining knowledge relative to a particular area is exposed to the most relevant information from a wide variety of sources without being inundated with extraneous facts, figures, and advertisements. Similarly, a user may select a particular audio or video program for recording from continuously broadcast information so that valuable time is not wasted viewing or listening to unwanted information.

Many people no longer "tune-in" to a single broadcast from beginning to end. Instead, people often interleave their viewing or listening with "channel surfing" and "ad zapping" or "filtering" of information. Filtering is commonly called "ad zapping" but is used herein to refer to elimination or avoidance of advertisements or other repetitive information, such as repeated news footage or the like. Surfing, as used herein, refers to searching over time and/or available information channels for "interesting" information.

A number of prior art systems have recognized the problem of eliminating extraneous information prior to recording for subsequent retrieval and review. Many of these systems are limited to use with video information (often in combination with audio information), such as a television broadcast, and are not easily adaptable to other forms of information.

Many of the systems designed for use with audio/video (AV) information rely on prior marking or coding of the information for subsequent identification by a recording device. For example, a television broadcast may contain information relative to the program characteristics and content such as the starting and ending times, the type or content of the program, a program guide summary, a classification, a rating, or the like. This additional information may be included when the signal is originally broadcast, but is typically added by an annotation service. The signal is received and decoded and may be used to control any of a number of devices. For example, closed captioning information may be decoded to provide a textual transcript of the audio information, or the decoding receiver may limit what type of programs are viewed. The signal may also be utilized to automatically record particular programs on preselected channels via control of a video cassette recorder (VCR) and VCR recording tape cassette. Annotation services have been relied upon to facilitate prior art systems which provide surfing functions.

Reliance upon an annotation service requires the viewer to subscribe to the service and forces the viewer to explicitly select a menu item which ultimately corresponds to an approximate time/channel slot. This is a continuing expense for the viewer and may not support all of the channels which the viewer receives. In addition, the interesting material, such as a sports broadcast during the nightly news, may not be considered a "programming unit" by the annotation service so it would not be given an identifier which could be used by such systems. Furthermore, the interesting information may be broadcast on other channels or time slots and would not be identified.

Other prior art systems and methods which are designed primarily to eliminate recording of commercials (zapping) during a program broadcast rely on a change in amplitude of the video and/or audio signal components to control the recording of the information. The recording device monitors the incoming signal while recording and detects commercials by the characteristic video fade and/or audio fade between a program segment and a commercial. When a commercial is detected, the recording is paused so that the unwanted information is not recorded. Some prior art systems pause for a predetermined period of time (i.e. 15 or 30 seconds) after detecting a fade (or eliminate material between two fades separated by a standard advertisement interval) to avoid recording the advertisement. These systems rely on non-intrinsic characteristics of the broadcast signal which may lead to incorrect blanks in the recording of the desired program material. For example, an artistic fade in the middle of a program broadcast may be mistaken for a fade prior to an advertisement resulting in an undesirable 30 second blank in the recorded material. In addition, these approaches are limited to the elimination of advertisements and would be difficult to adapt to elimination of other "uninteresting" information from the incoming information stream, such as repetitive news footage. Furthermore, as such systems become more prevalent, broadcasters may reduce or eliminate the fades altogether to defeat operation of these systems so that advertisements reach their intended audience.

Another approach found in prior art systems designed to provide automatic recording of a particular television program of interest, requires the user to enter an index code into a VCR which is decoded to determine the broadcast channel, program starting time, and program duration. Since these systems do not monitor the actual broadcast signal being received, once recording begins, it continues for the duration specified regardless of the particular content of the signal. These systems are subject to recording errors resulting from minor modifications to the programming schedule of the television stations. Such minor schedule changes often occur to accommodate important news broadcasts or the like.

One alternative approach used to eliminate advertisements includes adding control information to the recording so that the advertisements are skipped when the recording is replayed. This avoids lost information due to an erroneous indication of an advertisement but requires the user to wait while the recording is fast-forwarded through the advertisement. Since this approach also relies on audio/video fades; it could easily be defeated by broadcasters when the economic incentive becomes great enough. Another approach offered by at least one television manufacturer provides a "real-time"

zapping function which allows the viewer to scan other channels for 30 seconds before automatically returning to the original channel, so as to avoid a standard length advertisement.

Prior art AV editing systems have utilized the highly constrained structure of various news programs to segment a broadcast based on recognizing predetermined logos and faces of newscasters which are broadcast repeatedly. After receiving and recording a newscast or other structured program, these systems attempt to identify the various segments by separating the individual frames into regions and searching for the previously identified logos or faces. The segments are then classified and archived for use in future programs.

DISCLOSURE OF INVENTION

It is thus an object of the present invention to provide a system and method for selectively recording information based on intrinsic characteristics of the received information signal.

It is a further object of the present invention to provide a system and method which avoids recording information which a user has previously identified as being uninteresting.

Another object of the present invention is to provide a system and method for automatically locating and recording information of interest broadcast on any one of a number of available broadcast channels.

Yet another object of the present invention is to provide a system and method which automatically avoids recording repetitive information.

Still another object of the present invention is to provide a system and method which utilize sequential pattern matching to identify previously marked information and to control a recording device based on the outcome of the pattern matching.

A still further object of the present invention is to provide a data structure particularly suited for use in a system and method for selective recording of information which facilitates efficient, unique, and reliable pattern matching of information.

Another object of the present invention is to provide a system and method for selective recording of information which utilizes sequential pattern matching of information based on a summary statistical characterization of the information.

In carrying out the above objects and other objects and features of the present invention a system is provided which includes a persistent memory for memorized information segments (marked by user or by repetition) and control logic for computing and matching statistical vectors based on the received information. The control logic implements sequential pattern matching using the statistical vectors to identify memorized information within the incoming information stream. The control logic is linked to a recording device to selectively record information based on the result of the pattern matching.

A data structure is also provided for use with the present invention and with other similar systems designed to uniquely and reliably identify information of interest (or of no interest) for recording (or omission from a recording) using sequential pattern matching. The data structure is organized around statistical vectors, each characterizing an information "frame." An information frame is a short cohesive amount of data. For example, for video, this could be a single image field. The data structure includes an indexable table for each element of the statistical vector. Each table provides a list of the information frame "identifiers" associated with a given value or range of values of that element of the statistical vector. Each information frame identifier includes a statistical vector representing an information frame, a pointer to the previously stored frame, and a pointer to the subsequently stored frame. The sequence of information frames which are joined by previous/subsequent frame pointers will be referred to as an information segment. Depending on the mode of operation, the data structure may also include the time length to record following the memorized information segment or the last date/occurrence count of the memorized information segment.

A method is also provided for use with the system disclosed and other similar systems. The method includes controlling a recording device based on sequential pattern matching of information. The method includes marking information of interest, computing a sequence of statistical vectors representing the marked information, and storing the statistical vectors and sequence information to allow future pattern matching. The method also includes identifying memorized information segments within an incoming information stream utilizing sequential pattern matching against the memorized sequence of statistical vectors, and controlling a recording device based on the result of this pattern matching.

There are a number of advantages accruing to the present invention. For example, the system and method of the present invention use summary statistics, which capture intrinsic signal information, to detect repetitive material or information of interest, rather than using unintentional signal content, such as audio and/or video fades or annotations. As a result, the present invention does not require an annotation service to provide broadly distributed annotations of the broadcast information. Nor does it rely on unintentional, and avoidable, artifacts of composited media.

Another advantage of the present invention over those systems and methods found in the prior art is that the statistical characterization of the information utilized by the present invention will reduce or eliminate the possibility of false detections resulting in incorrect blanking in the recording of desired information. Since the present invention does not rely on amplitude changes of the received information, its function will not be impaired by incorrect blanking caused by unanticipated changes in the received signal during the course of a program broadcast.

Also unlike prior art systems and methods, the present invention is capable of recording information of interest from any of a large number of received channels without knowing a priori on which channel or at what time the information of interest will be broadcast. Many prior art systems require the user to enter the broadcast time and channel, or a code representing that information, which is translated by the recording device. In contrast, the present invention does not require the user to locate such broadcast information, but only to provide a representative sample of the stable (repeated from installment to installment) introductory information and the length of time to record once the introductory information is located.

Another advantage of the present invention is its applicability to a variety of media sources. The present invention is not limited to audio and/or video information, or broadcast information in general, but may be utilized for sequential pattern matching of virtually any time-based information signal. For example, the present invention may be used in sequential pattern matching of seismographic information, pressure information, or object profile information (such as used in radar and the like) to name a few.

The above objects and advantages in addition to other unenumerated objects, features, and advantages of the present invention will be readily appreciated by one of ordinary skill in the art from the following detailed description of the best mode for carrying out the invention when taken in connection with the accompanying drawings.

BRIEF DESCRIPTION OF THE DRAWINGS

FIGS. 2a and 2b depict data structures for use with a selective information recording system and method according to the present invention;

FIG. 8 is a flow chart illustrating operation of an assisted-marking zapping mode according to the present invention;

BEST MODE(S) FOR CARRYING OUT THE INVENTION

It should be recognized that the flowcharts presented in FIGS. 1 through 9 in describing the present invention depict sequential processing of the method steps although any of a number of processing strategies could be utilized without departing from the spirit or scope of the present invention. For example, if the control logic is implemented in hardware, many of the method steps may be performed simultaneously or nearly simultaneously. Similarly, an interrupt driven processing strategy could also be utilized to achieve the objects and advantages of the present invention. One of ordinary skill in the art will also recognize that the concepts of the present invention may obviously be extended to a corresponding parallel implementation without departing from the spirit or the scope of the present invention. Similarly, a combined sequential/parallel implementation utilizing hardware and/or software to accomplish one or more of the objects and advantages of the present invention is within the contemplation of the present invention.

It should also be recognized that, while the flowcharts presented in FIGS. 1 through 9 depict each of the various surfing and zapping modes operating separately and in isolation, the combination of any or all of these methods could be used without departing from the spirit or scope of the present invention. For example, assisted-marking zapping and assisted-marking surfing may be combined within a single system or method, by simply marking the individual information segments as "for surfing" or "for zapping".

Figure 1:
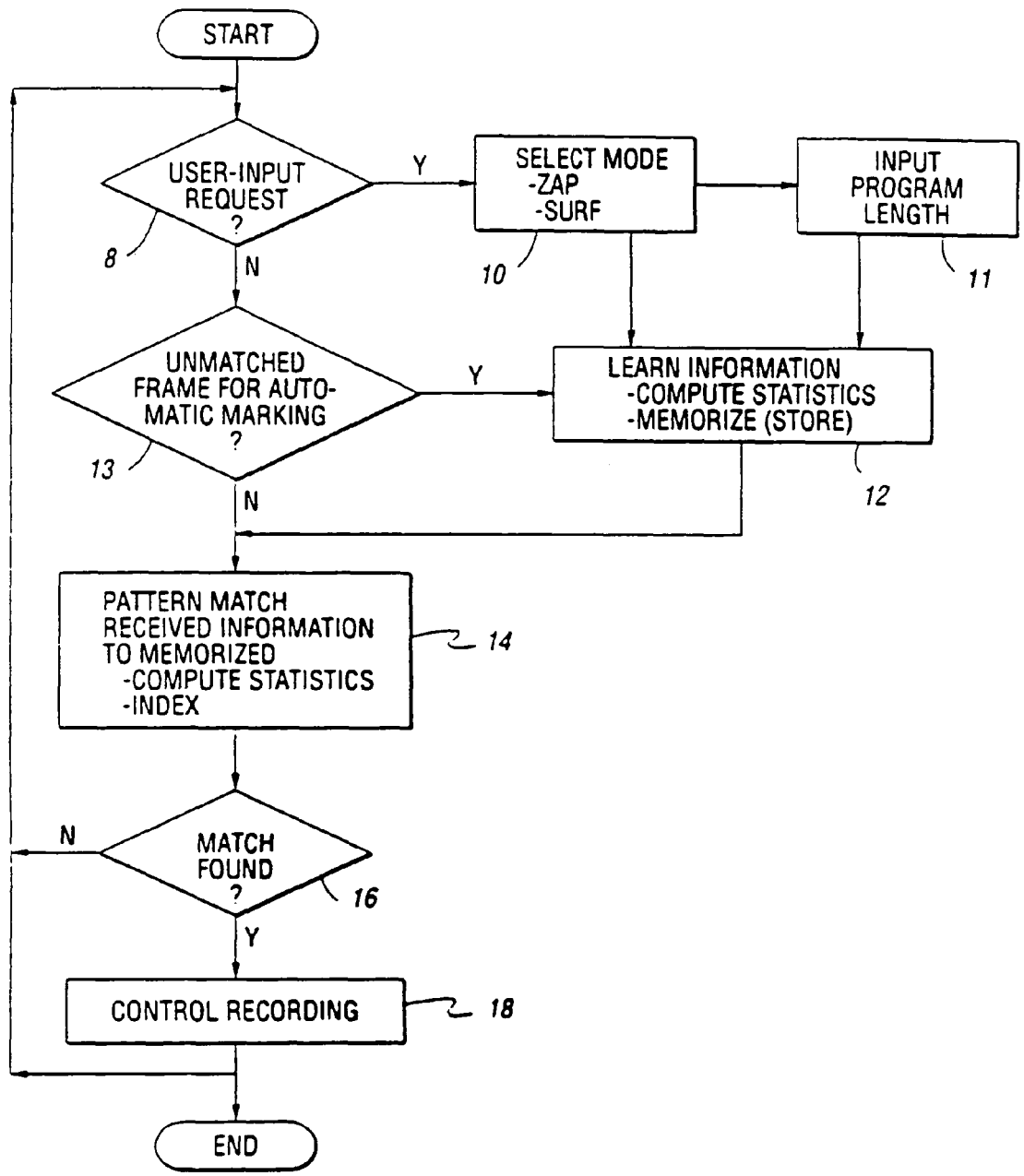
FIG. 1 is a flow chart illustrating the basic operation of a system and method according to the present invention.

Referring now to FIG. 1, a flow chart illustrating operation of a system and method for selective recording of information according to the present invention is shown. A user-input request is detected at block 8. A current operating mode is then selected by the user as represented by block 10.

The present invention includes two main operating modes which share the same computational engine. The surfing function is used to locate previously marked and memorized information segments which activate a recording device to record for a designated period following the sequence. These information segments may be marked by user-marking or by assisted-marking. The zapping function is used to avoid recording previously encountered information segments. These information segments may be marked by the user, marked through assisted marking, or automatically determined by the system. The user-marking modes rely on user input to determine both the beginning and end of the information segments. The assisted-marking modes rely on a small amount of user input and assist the user in identifying the beginning and end of the information segment. The automatic-marking mode (for zapping only) characterizes and stores all information received while continuously comparing incoming information with the previously memorized (stored) information to identify repetitive sequences. Repetitive information is reinforced while all other information is eventually deleted from memory through a "selective forgetting" operation as described in detail below.

The choice between user-marking, assisted-marking and (for zapping only) automatic-marking may be a design decision where, in any single device, only one of the two classes is used for surfing and only one of the three classes is used for zapping. However, as is obvious from their descriptions, more than one class or marking could be supported for either zapping or surfing, if that extra flexibility is desired.

Returning now to FIG. 1, the user inputs the program length at block 11 if the surfing mode is selected at block 10. Block 12 represents the learning (memorizing) of information which includes characterizing the information utilizing summary statistics and storing the information in an indexable table. The information which is learned may be marked by the user or automatically marked by the system depending upon the particular mode selected in step 10. Information marked by a user for the surfing mode should include stable (repeated from installment to installment) identification information, such as opening credits or a title screen in the case of video information. For zapping modes (user-marked, assisted-marking, and automatically-marked), marked information may include a particular program, advertisement, or commercial which the user does not want recorded. Of course, the present invention is not limited to any particular type or content of information and is applicable to any time-based information signal.

While in the automatically-marked zapping mode, block 13 determines if the current incoming frame is an unmatched frame which should be memorized by block 12. Sequential pattern matching of received information to memorized information is then performed at block 14 of FIG. 1. This step is performed autonomously by the system without user intervention. Incoming information is characterized using summary statistics and then pattern matched to previously memorized information. Block 16 determines if a successful match has been found in the incoming information and directs subsequent control appropriately. If a match is not found, the system continues attempting to locate the marked information by repeatedly characterizing the received information and matching it to the memorized information until interrupted by the user.

When a successful match is indicated at block 16, a recording device is appropriately controlled as represented by block 18. Depending on the mode of operation which was selected at block 10 when the matched information segment was memorized, a successful match of the marked information serves a different purpose. In the zapping modes, the incoming information which matches the memorized information is not recorded. However, in the surfing modes, the matched incoming information initiates the recording process which then continues for a designated time period thereafter.

In modes of operation other than the automatically-marked zapping mode, unmatched information is quickly discarded or "forgotten" and is not memorized. In the automatically-marked zapping mode, however, all incoming information is memorized for comparison to future incoming information. Repetitive information (that which is successfully matched) is then automatically zapped and is not recorded. A successful match also reinforces the previously memorized information. Eventually, unmatched (and therefore unreinforced) information which was previously memorized will be discarded through a "selective forgetting" process as required by available memory space.

A graphical illustration of data structures particularly suited for use with the selective information recording system according to the present invention is shown in FIGS. 2a and 2b. The operations of learning (memorizing) time-based information and subsequent labeling (matching or indexing) of that information are facilitated by these data structures which employ statistical vectors to characterize the information. These vectors are utilized to uniquely and reliably identify a segment (or sequence of frames) of received information. Uniqueness is required so that distinct segments of media are not mistaken for one another. Reliability is required so that a single segment of media which is received twice will match itself. The necessary uniqueness may be provided in part by careful selection of the statistics utilized to characterize the information segment. The sequencing (order and adjacency) of memorized information also provides uniqueness through time that should be reproduced when the same material is subsequently received. Thus, using a sequence of consecutive frames to determine a match improves the confidence of the match so as to reduce the possibility of an erroneous matching indication.

As indicated earlier, a frame of media as referred to herein means a short time interval of the media which remains unchanged by its surrounding material. For example, a standard frame in video is a $\frac{1}{30}$th-second image along with the coincident $\frac{1}{30}$th second of audio. A "frame" of sound is more difficult to define since there are no natural "synchronization" marks as are present with conventional video signals. A reasonable audio frame may be defined by a 20-millisecond section with the assumption that the beginning and end frames (which may be contaminated by other material) can simply be ignored. For digital information, a frame of information may be determined by the particular communication protocol used in transmission and reception. The operation of the present invention does not require any particular, well-defined frame length. However, the statistics chosen to characterize the information should be particularly robust to different framing offsets for audio-only sources.

As illustrated in FIG. 2a, a first data structure, indicated generally by reference numeral 30, includes an indexable table 32 for each element 34 of the statistical vector 36. In a preferred embodiment, indexable table 30 is implemented using a balanced binary search tree as depicted in FIG. 2a. However, one of ordinary skill in the art should appreciate that a number of alternative searching implementations could be utilized to effect the system and method of the present invention, such as arrays, heaps, hash tables, and the like. In the preferred embodiment illustrated in FIG. 2a, each balanced binary tree 32 includes a plurality of nodes 38 each being characterized by a memorized interval, such as interval 40. An interval which includes the end-point value is indicated by a bracket, "[", while an interval which does not include the end-point value is indicated by a parenthesis, ")". Thus, the interval [4 7) includes values greater than or equal to four (4) and less than seven (7), but not equal to seven (7). As is known in the computer-related arts, each binary tree may be balanced to increase searching efficiency when locating matching statistics of desired information. Thus, as each tree grows, the depth of the tree is balanced using the process of rotation to put the root of the tree at the center of the leaves so that no branch extends more than one leaf deeper than any other branch. A detailed explanation of this strategy is provided by Robert Sedgewick, *Algorithms*, pp. 187-201 (Addison-Wesley 1983).

The original intervals are formed when an information frame is memorized by adding and subtracting an error margin to the computed statistical value for each statistical element 34 in statistical vector 36. The error margin, and thus the span of the original interval, depends upon the level of noise expected in the received signal (which may depend on the type of signal, i.e. analog or digital). An appropriately selected error margin increases the reliability of the pattern matching process. An analog signal may require a wider interval for satisfactory operation than the interval necessary for the same quality of operation when receiving a digital signal. If the error margin is too small for the quality or type of the received information signal, information which should match previously identified material will not be detected. If the error margin is significantly larger than necessary, the system will identify information segments which have similar statistical representations but which are not intended to be matched. This results in an inefficient matching process and may result in erroneous matches.

The particular statistics utilized to characterize the received information should be chosen based upon the type of information and the type of signal received. In a preferred embodiment of the present invention, the received signal is a compressed audio and video signal which conforms to the Joint Photographic Experts Group (JPEG) compression strategy, which is well known in the art. The set of statistics utilized in this case may be as simple and readily available as the spatially-aliased, bandpass thumbnail sketch of the received information frame. For example, each statistical element 34 may be obtained from the low-frequency coefficients in two-space (not including the zero frequency or DC coefficient) of an eight by eight block (of pixels) discrete cosine transform (DCT) used in JPEG or MPEG (Motion Picture Experts Group) compression along with the compressed audio signal corresponding to the video frame period. As is known in the art, the DCT is only one of the many available fast unitary transforms which may be used. The block DCT transform is particularly suited to this application since it compresses most of the entropy of the information into a small number of coefficients which may then be utilized as a unique summary characterization of the information segment. Some examples of other transforms which may be used include the wavelet, the block-Hadamard, and the block-Karhunen-Loeve transforms.

Alternatively, simpler statistics may be utilized depending on the information signal, such as row and column averages. Of course, more than one type of statistic could be used to determine one or more of the statistical elements 34 in statistical vector 36 so as to uniquely characterize the received information. The sensitivity of the selected statistic to noise in the received signal may also influence selection of the interval size. While the error intervals, such as interval 40, are preferably centered about the value of a corresponding statistical element 34, other offsets may be utilized without departing from the spirit or scope of the present invention. Similarly, the intervals may include only a single value.

With continuing reference to FIG. 2a, as intervals 40 are stored, they are subdivided into multiple, non-overlapping intervals as each indexable table (binary tree in a preferred embodiment) grows in such a way that the final stored intervals associated with the outermost nodes are uniform as well as non-overlapping. In a preferred embodiment, each node 38 of a binary tree 32 points to a list of one or more frame identifier names (or titles) 42 associated with the value or values contained within the interval corresponding to that node.

As illustrated in FIG. 2b, a frame identifier, such as frame identifier 50, is another type of data structure utilized in the system and method of the present invention. A frame identifier includes a statistical vector having statistical element values corresponding to a particular frame of received information and pointers to the frame identifiers which correspond to the adjacent frames (precedent 52 and subsequent 54) in the originally received time sequence, if those frames have been memorized. If the frame is the first or last in a particular sequence, the pointers contain a zero or null indication for the previous 52 or subsequent 54 frame identifier, respectively. The frame identifiers also contain a value 56 representing the minimum number of sequential frames which must be matched to be considered a successful match, the time length of information 58 to follow a particular sequence of frames (and therefore the length of time to record interesting information), and the last occurrence 60 and frequency 62 of a frame matching that particular frame identifier.

Some fields of each frame identifier are not used in all the available operating modes. Thus, a system of diminished functionality could be produced using a data structure without those corresponding fields. For example, the program length field 58 is used only by the surfing functions to determine the length of time to record after a successful match has been indicated. The last occurrence 60 and frequency fields 62 are used only by the automatically-marked zapping mode of operation. Thus, an appropriate data structure is created including only the necessary fields as indicated by the current operating mode.

Figures 3A, 3B:
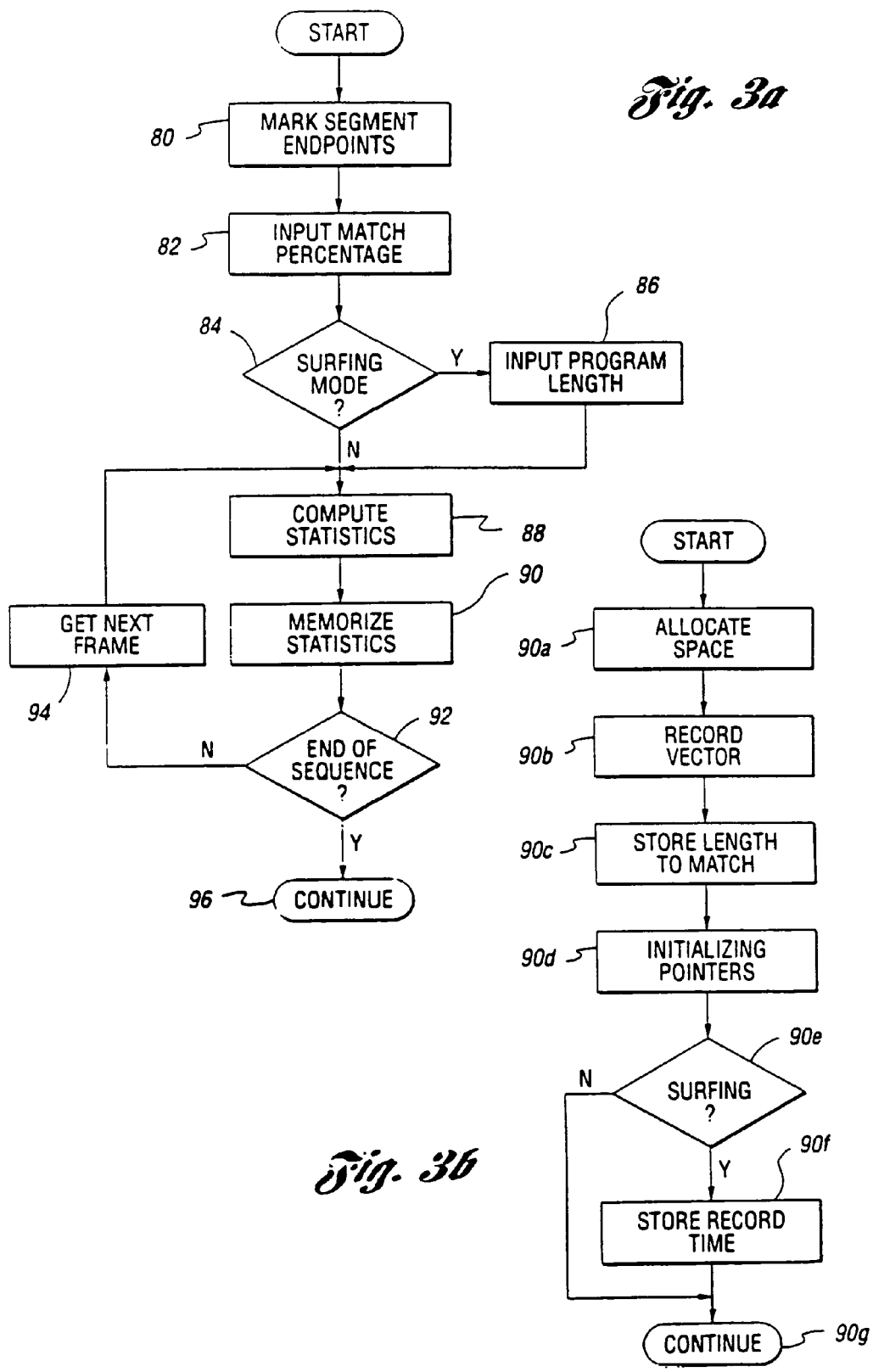
FIGS. 3a and 3b are flow charts illustrating information selection for user-marked surfing and zapping operation modes according to the present invention.

Referring now to FIG. 3a, a flow chart illustrating information selection for user-marked surfing and zapping operation modes according to the present invention is shown. At step 80, the user initiates the process by marking the start and end of an information segment which is to be memorized and later sought to begin a recording session or to be omitted from a recording. For example, the user may mark the beginning credits of a favorite program or the user may mark a disliked commercial advertisement. The user indicates the minimum length of a match against this desired information at step 82 by selecting the percentage of the marked information sequence which must be matched for the match to be considered successful. Thus, a match may be considered successful even if the very beginning of the sequence is not observed without allowing a single frame match to trigger either the zapping process or the surfing process. The beginning of the sequence may not be identified when, for example, a user initiates zapping or surfing part way through the broadcast of a memorized information segment or when a user-input session interferes with the autonomous part of the zapping and surfing modes.

As illustrated at step 84 of FIG. 3a, if the surfing mode has been selected, the user must input the program length at step 86. The program length represents the period of time to operate an attached recording device to record the desired program after a successful match of the information segment has been indicated. At step 88, a statistical vector is computed for the current frame of information based on the selected set of statistics as discussed with reference to FIGS. 2a and 2b. At step 90, a frame identifier (illustrated in FIG. 2b) is created and recorded within the memorized (stored) tables, as explained in greater detail with reference to FIG. 3b. If the end of a marking sequence is indicated at step 92, the input process is complete and the system and method continue by autonomously searching for the marked information segment (and previously marked information segments) within the incoming information stream.

Otherwise, the next frame of information is obtained as indicated by step 94 and the process continues with step 88. Steps 88 through 94 are repeated until all the frames of the marked information segment are recorded both as a sequence of consecutive frame identifiers and as nodes in the indexable table. After the input process has been completed, control passes to the appropriate process for the current operational mode as indicated by step 96. The various operational modes are illustrated and described in detail with reference to FIGS. 4 through 9.

FIG. 3b provides a detailed illustration of a process for creating a frame identifier. The process begins at step 90a by allocating space for the data structure. The statistical vector characterizing the associated received information frame is recorded within the data structure at step 90b. The minimum length for a successful match is stored at step 90c and the adjacent frame pointers (such as previous pointer 52 and subsequent pointer 54) are initialized at step 90d. This may include entering a null value for the first or last frame in a particular sequence as discussed with reference to FIG. 2b. If surfing mode is active as indicated by step 90e, the recording time for the program of interest is stored within the frame identifier at step 90f. Otherwise, control is passed to step 90g without entering the program length information.

Preferably, the user marking and memorizing processes illustrated in FIGS. 3a and 3b are completed on a system with sufficient resources so that the computational throughput is equal to or greater than the frame rate. The throughput and latency of the creation of the frame identifiers, the computation of the error intervals and the creation of the indexable table from these intervals do not have to occur at the information reception rate, as long as the frame statistics are buffered in sequence until these operations are completed.

The system utilized to implement the user marking and memorizing process should have sufficient memory to buffer the frame statistics until the processing, or memorizing is completed, i.e. until the appropriate intervals and sub-intervals are created and the statistics are properly located within the indexable table. A preferred system also includes sufficient memory to accommodate a large number of frame identifiers since a frame identifier must be retained for each frame in the marked sequence throughout the operational life of the system, or until they are deleted by the user. The memory should also preferably be sized to accommodate a search tree for each element of the vector of frame statistics throughout the operational life of the system.

Figure 4:
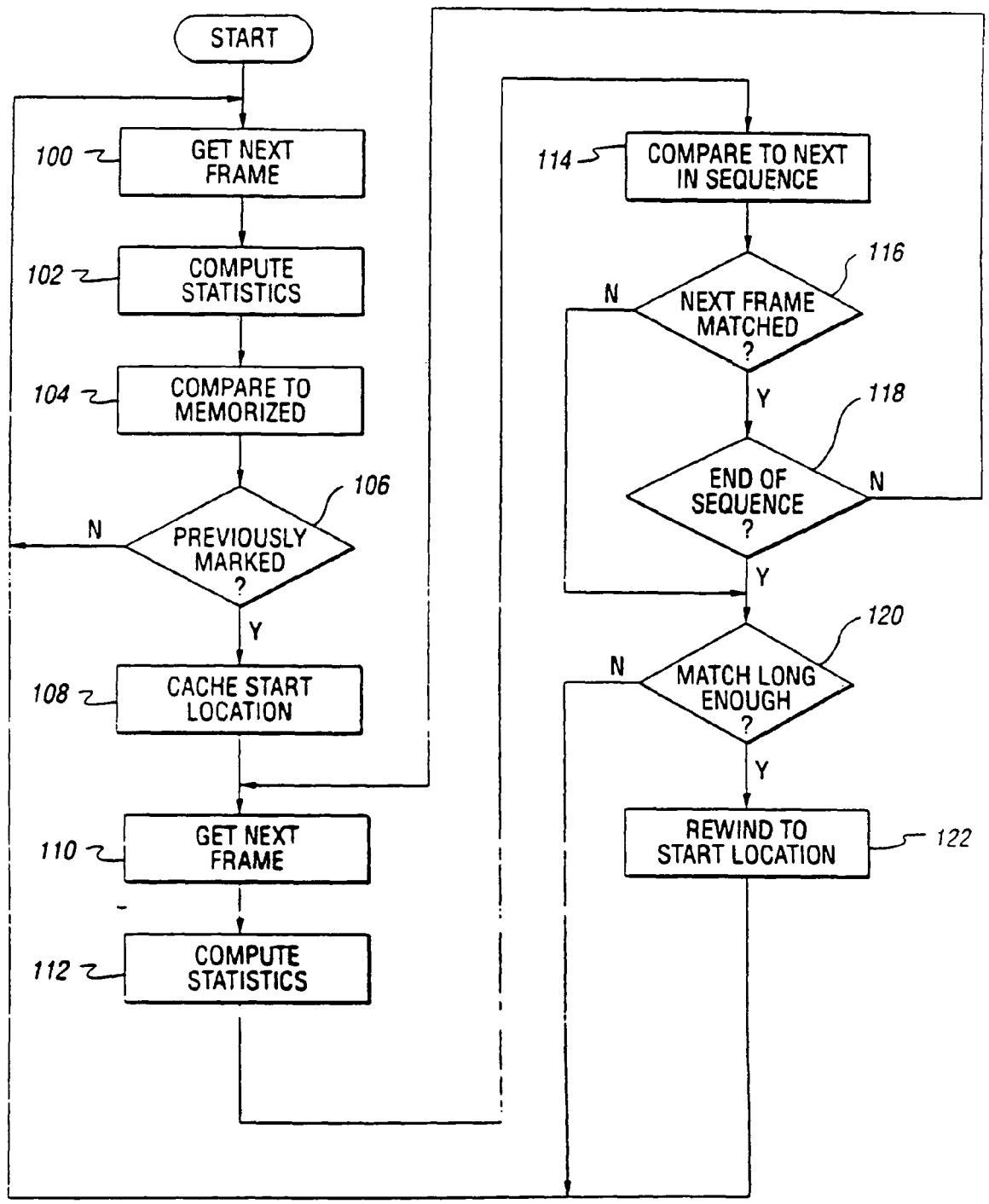
FIG. 4 is a flow chart illustrating operation of a user-marked zapping mode according to the present invention.

Referring now to FIG. 4, a flow chart illustrating the user-marked zapping function according to the present invention is shown. Once information has been selected as uninteresting by the processes illustrated in FIGS. 3a and 3b, the user-marked zapping function enters an independent mode of operation. One object of this process is to pattern match the incoming information frames (which are being recorded by a recording device) against the memorized sequences. If a match of sufficient length is detected, the recording is affected appropriately. This may include reversing or rewinding to the point where the match was first detected. Alternatively, control information may be added to the recording so that the marked information is skipped during subsequent playback or a delay buffer, inserted between the incoming information stream and the recording device could be emptied, with the recording paused until it refilled.

A frame of information is obtained from the incoming information channel being recorded at step 100. A statistical vector is calculated at step 102 using the same statistical calculations which were utilized during the user marking and memorizing process of FIGS. 3a and 3b. Step 104 compares the current statistical vector with previously encountered statistical vectors. The tables of memorized statistics are examined to determine if the same or a similar set of statistical values were already encountered, preferably utilizing balanced binary search trees corresponding to each element of the statistical vector.

In a preferred embodiment, indexing into each binary tree is completed by finding all the leaves of the tree having an interval which contains the value computed for the current statistical element. For the first element and the first binary tree, the identification numbers which have been indexed in this manner are placed into a temporary cache. For each of the remaining elements and binary trees, the identification numbers in the temporary cache must be found among the indexed leaves, otherwise they are deleted from the cache. Step 106 determines when the temporary cache becomes empty, which indicates that the current statistical vector does not match a previously marked statistical vector and the indexing process terminates. Once the indexing process terminates, a data counter, which indicates the location of the current frame within the incoming information stream, is incremented and the program control returns to step 100.

At step 108 of FIG. 4, the starting location (i.e. frame number or position) for a memorized recording is cached. This will be used in rewinding or reversing the recording to delete the memorized information detected within the incoming information stream if a sufficient number of sequential frames are matched. Step 110 then obtains the next frame of information and step 112 computes a corresponding statistical vector for the subsequent frame in the same manner as step 102. Step 114 compares this statistical vector to the statistical vector of the subsequently memorized frame identifier as indicated by the corresponding subsequent pointer (54 of FIG. 2b). Since the subsequent frame is indicated by a pointer, indexing into the memorized tables is not required.

As indicated by step 116, if the next memorized frame statistics match the statistics computed in step 112, then step 118 determines if the end of the memorized sequence has been reached as indicated by a null value in the subsequent frame field 54 of the frame identifier. If the end of sequence is not indicated, control continues by incrementing the data counter to select and process the next frame within the incoming information stream at step 110. Otherwise, if step 116 determines the current frame does not match the subsequent frame of the memorized sequence, or step 118 determines that the memorized sequence has ended, control continues at step 120.

The length of the matched sequence (i.e. number of frames) is compared with the minimum match length of the selected memorized sequence at step 120 to determine if the match is long enough to indicate success. In the user-marked zapping mode, the determination as to whether the matched sequences were "long enough" depends on both the minimum match length indicated by the user in step 82, and on the constraints imposed by the computational latency. For example, if the latency of steps 102 and 104 is longer than a frame period and the latency in the loop of steps 110 through 118 is less than a frame period, the "long enough" constraint includes the need to make up for the excess latency of steps 102 and 104 and to thereby "catch up" to the current frame.

If the match is long enough as determined at step 120, step 122 controls the recording device to zap the marked information from the recording. This may be completed by returning to the starting location which was stored at step 108, such that the intervening information frames will be deleted or subsequently rerecorded and therefore lost, or by recording a control code to skip the marked information upon playback or by emptying a delay buffer, inserted between the incoming information stream and the recording device and pausing the recording until it refilled. If the result of step 120 is negative, the recording device continues uninterrupted recording and the process is repeated with step 100 to search for a matching sequence.

The computational capabilities of a system implementing the user-marked zapping function should provide a latency for computation of the frame statistics and the comparisons which is less than a single frame period. The latency of indexing into the memorized tables can be greater than a single frame period as long as its computational throughput is greater than the frame rate, and the latency delay is compensated for by the simple frame statistics computation/comparison loop (i.e. steps 110 through 118) in less than the time length of the marked sequence. An implementational system should also have sufficient memory to buffer the current frame statistics until such time as processing can be completed. The system should also have a cache for frame identifier numbers to provide for indexing across the separate memorized tables.

Figure 5:
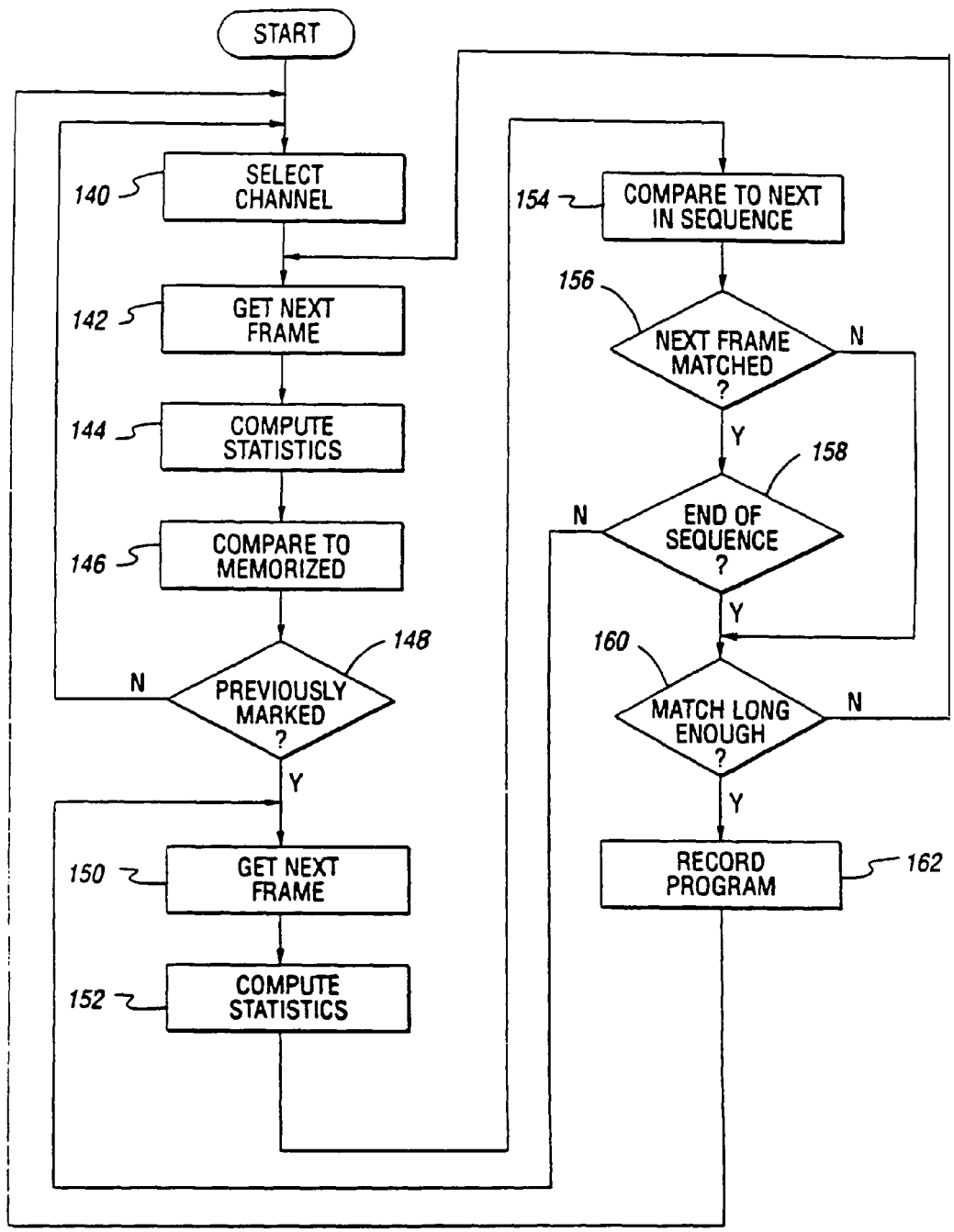
FIG. 5 is a flow chart illustrating operation of a user-marked surfing mode according to the present invention.

FIG. 5 illustrates the user-marked surfing function of the system and method for selective recording of information according to the present invention. The surfing function allows a user to find and record material which follows a segment which has been previously marked. After the information is marked, the surfing function continually scans the available channels to find the designated material. Once that material is located, subsequent information is recorded for a predetermined period of time as indicated by the user.

Step 140 of FIG. 5 selects a current channel to search for the marked information. This step may be done in a variety of different ways including random selection, unbiased scheduling, or biased scheduling, among others. Random selection could utilize a random number generator to select the current channel. Unbiased scheduling would follow a predetermined channel order such as stepping through available information channels using channel numbers as an ordering function. Biased scheduling would modify unbiased scheduling by monitoring preferred channels more often than other channels. Preferred channels could be selected by the user or they could be selected automatically by the system based on past success in finding programs containing information of interest.

With continuing reference to FIG. 5, step 142 obtains the current frame of information from the incoming information stream. A statistical vector is computed at step 144 to characterize the incoming information frame and compare it to previously memorized frames at step 146. Steps 148 through 158 process the incoming information frames in a similar manner as previously described steps 106, 110, 112, 114, 116, and 118, respectively. Step 160 determines whether a match is "long enough" to indicate success based only on the minimum match length indicated by the user during the information identification process illustrated in FIGS. 3a and 3b.

Step 162 controls the recording device to begin recording information and continue for the predetermined time period specified by the user during the information marking process. In one embodiment, the search for other memorized information is suspended for the period during the recording. In another embodiment, if more than one sequence has been marked for recording and a preference is indicated among the marked sequences, the system continues to monitor available information channels while recording to locate information having a higher preference code. If such information is located, the current recording can be terminated so the higher preference material may be recorded.

The computational and memory requirements for a preferred system implementing the user-marked surfing function are directly proportional to the computational and memory requirements for the user-marked zapping function. The proportionality constant varies between unity and the number of available information channels, depending on the need to scan multiple channels in a single frame period. This requirement, in turn, depends upon the length of the marked information and the percentage match required to indicate a successful match.

Figure 6:
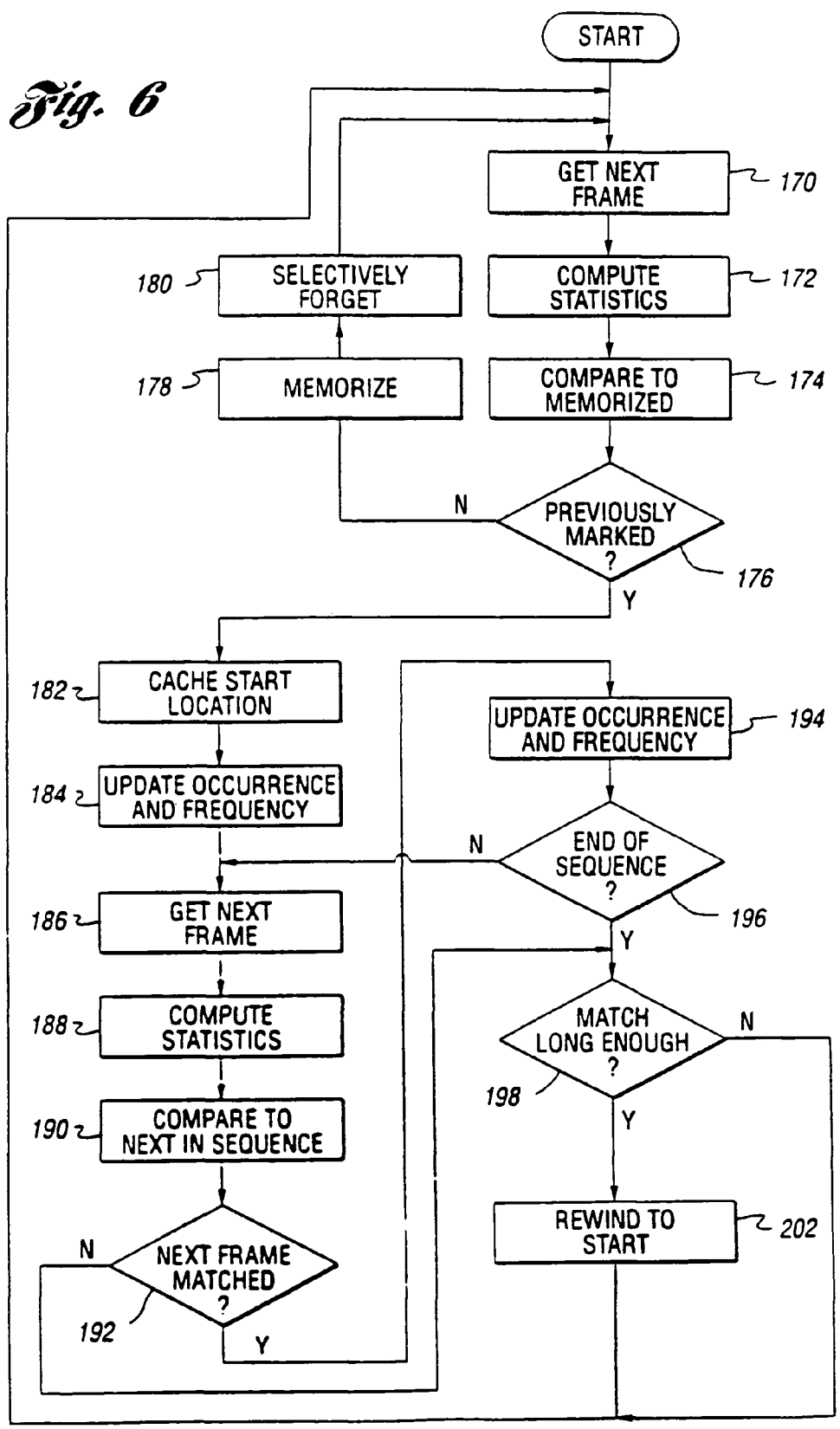
FIG. 6 is a flow chart illustrating operation of an automatically-marked zapping mode according to the present invention.

Referring now to FIG. 6, a flow chart illustrating an automatically-marked zapping function of a system and method for selective recording of information according to the present invention is shown. Automatically-marked zapping has the same goal as user-marked zapping: eliding repetitive material from a recording. Instead of requiring the user to mark the material, however, automatically-marked zapping keeps track of all the information which has been received in the recent past.

Step 170 of FIG. 6 obtains the next frame of information for step 172 to compute an appropriate statistical vector as previously described. Step 174 compares the current frame statistical vector with previously memorized statistical vectors as previously described. If the current statistical vector does not match any of the memorized vectors as determined by step 176, the control logic proceeds to step 178 which creates and memorizes a new frame identifier. For the automatically-marked zapping mode, the created frame identifier data structure includes a time stamp indicating the date and time at which the information was recorded and a frequency counter which monitors the number of times a frame matching that particular statistical vector has been detected. The frame identifier is then created as illustrated in FIG. 3b by allocating space, initializing the pointers, and recording the statistical vector. However, no minimum match length is recorded in this frame identifier. Instead, a single, global value is used. Once the frame identifier structure has been created, it is stored in the memorized tables as previously described with reference to the user-marked zapping function.

Step 180 is performed only periodically to selectively forget information so as to reduce the size of the memorized tables. Otherwise, the size of the memorized tables would grow without bound the longer the automatically-marked zapping mode was active. To avoid difficulties associated with using all the available memory, and increasingly difficult indexing of information, the size of the memorized tables is thus periodically reduced.

The memorized tables are reduced in size by traversing the memorized tables, examining each frame identifier to determine the last time it was received and the frequency of recognition. The frame identifiers which are too old or too infrequently encountered are then "forgotten". The process of "forgetting" a frame identifier includes removing all pointers to that identifier (in their predecessor and successor frames and in the memorization tables) and allowing the memory occupied by that frame identifier to be reallocated by the system. The control logic then returns to step 170 and the process continues.

With continuing reference to FIG. 6, if step 176 indicates a match with a previously memorized frame, step 182 caches a starting position or frame so the recording device may be reversed or rewound if a successful sequence match is indicated as previously described. Step 184 updates the occurrence and frequency counters in the appropriate frame identifier data structure which matched the current statistical vector.

With continuing reference to FIG. 6, step 186 obtains the next frame of information while step 188 computes the statistical vector and step 190 compares the statistical vector to the next memorized frame in the sequence. Step 192 determines if the current frame matches the next memorized frame, as previously described with reference to steps 150 through 156 of FIG. 5. Step 194 updates the occurrence and frequency information similar to step 184 if the next frame is matched as determined by step 192. Subsequent frames are analyzed until the end of sequence is indicated by step 196. Step 198 determines whether a matched sequence is of sufficient length to be considered successful as previously described with reference to user-marked zapping, noting that the minimum match length is now determined using the previously mentioned, global number.

Step 202 of FIG. 6 then controls the recording device to automatically zap the repetitive material from the recording. Similar to the user-marked zapping mode, zapping may be performed by returning to the position stored at step 182, or by recording control codes which skip over the marked information upon playback or by emptying a delay buffer, inserted between the incoming information stream and the recording device and pausing the recording until it refilled.

The computational requirements of a preferred system implementing the automatically-marked zapping function are the same as those described for the user-marked zapping function with the additional requirement that the throughput of creating and memorizing a new frame identifier must be greater than the frame rate. The computational requirements of step 180 to selectively forget frame identifiers will not be constrained as long as this step is only occasionally necessary. In that case, the reduction can be completed when there is no incoming information frames (i.e. the recording device is off or the automatically-marked zapping function is disabled). If necessary, the reduction process can occur in the middle of a zapping session, by temporarily suspending the zapping function. During that time, repeated video would not be zapped from the recording and none of the incoming information frames would be memorized.

The memory requirements of a preferred system implementing the automatically-marked zapping function of the current invention are similar to those described to implement the user-marked zapping function. However, the memorizing process is continuous and newly memorized frames are preferably retained for at least the minimum expected repetition period before they are forgotten during a memorized table reduction. For example, a user who wishes to avoid recording advertisements during video recording may activate the automatically-marked zapping function during regularly recorded programs. If the program material is about two hours per day and the advertisements that are shown during those programs are repeated daily, then the automatically-marked zapping function would have to have enough memory to retain the frame identifiers and the indexing tables to accommodate just over two hours of video information. This would allow the advertisements to be seen more than once before their statistical vectors and frame identifiers would be removed due to memory constraints.

Figure 7:
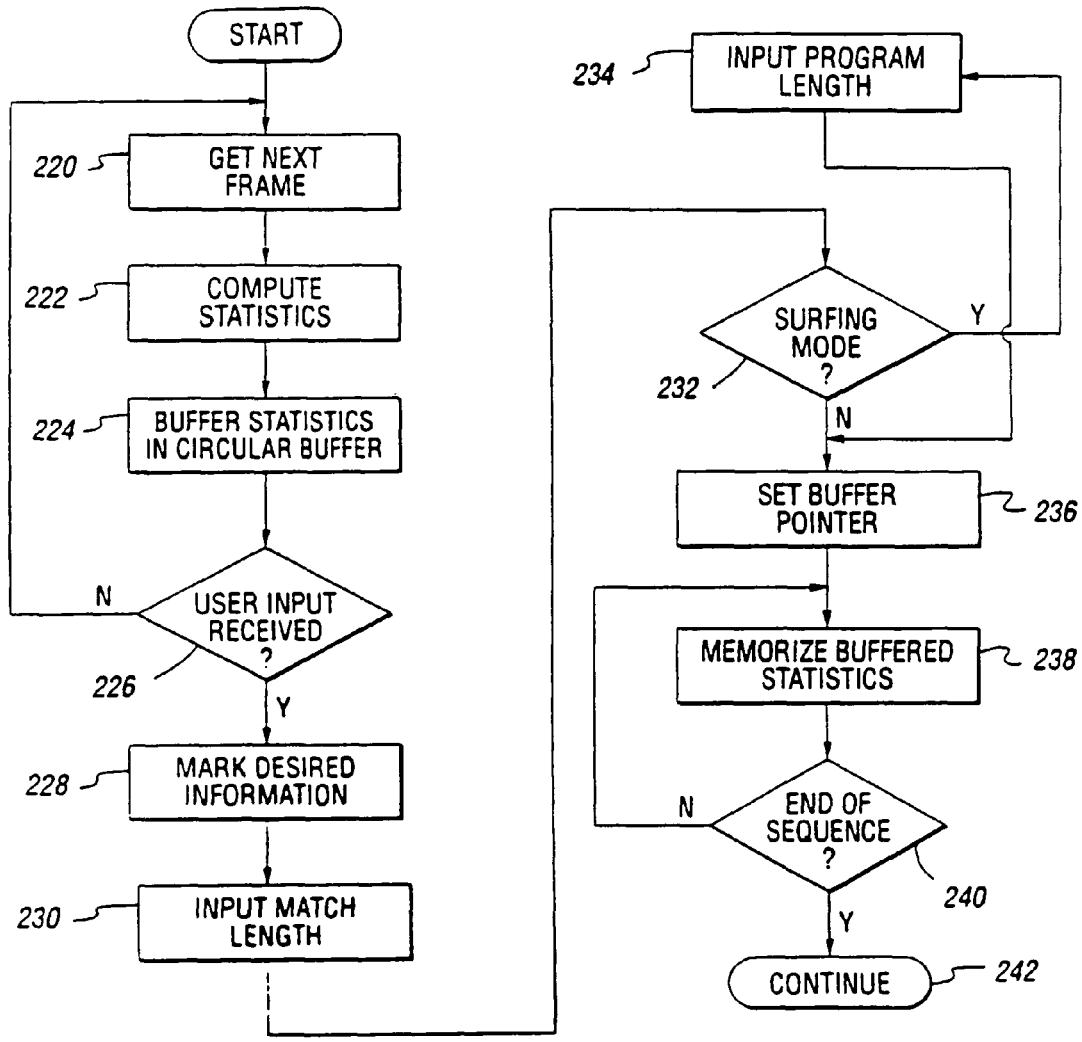
FIG. 7 is a flow chart illustrating information selection for assisted-marking surfing and zapping modes according to the present invention.

Referring now to FIG. 7, a marking and memorizing process for assisted-marking zapping and surfing modes of a system and method for selective recording of information according to the present invention is shown. This user-input portion is similar to the user-input portion of the user-marked zapping and surfing functions illustrated and described with reference to FIGS. 3a and 3b. Assisted marking thus reduces the amount of effort that is required from the user to mark an information index without significantly increasing the amount of required system memory.

At step 220 of FIG. 7, a frame of information is obtained and step 222 computes a statistical vector representative of the information within the received frame. A statistical vector is calculated for each incoming information frame instead of only the frames occurring between a user-specified starting and ending point as illustrated in FIG. 3a. At step 224, the statistical vector is buffered, preferably in a circular buffer, to accommodate a predetermined response time of the user (equivalent to the "recall" length of the buffer). This provides a sequence of a predetermined number of previous frame statistical vectors which is available at all times. This allows for some delay. A starting point is estimated as being the recall length before the user mark. An ending point is estimated as being the input match length after the user mark. The input match length is input at step 230. The starting and ending points along with intervening frames are then memorized as explained in greater detail below. It is not necessary to compensate for the response time with any precision since chunking and sequence extension (explained below with reference to FIGS. 8 and 9) adjust the boundary points of the memorized segment.

Step 226 determines if a user input has been received indicating the desire to mark information. If no user input is received, a statistical vector is computed on the next frame of information and stored in the circular buffer by repeating steps 220 through 224. Once the circular buffer is full, the statistical vector of the next following frame replaces the oldest (in time) received frame in the buffer, etc. Once user input is received, step 228 marks the position within the circular buffer of the indicated starting frame.

At step 230, the user inputs the minimum number of frames to indicate a successful match. This information is used to allow a successful match even if the very beginning of the sequence is not observed and also to determine the minimum amount of information to be collected and memorized for later marking. The latter use is necessary for this mode since the user does not indicate a starting and ending point, but provides only a single indication to mark the sequence. If surfing mode is indicated at step 232, the program length is entered at step 234 and the control logic continues with step 236. Otherwise, step 234 is skipped and the process continues with step 236.

Step 236 moves the circular buffer pointer backward (as measured by time) through the circular buffer a length equal to the recall length. Thus, the oldest statistical vectors can be memorized before they are overwritten by vectors characterizing subsequently received information frames. This also allows information received before the user-marked starting frame (saved at step 228) to be inserted into the memorized tables by steps 238 and 240. Subsequent frames continue to have their statistical vectors calculated and stored in the circular buffer while steps 238 memorizes the statistics until step 240 detects the end of the sequence. Unlike the user-marked input process illustrated in FIGS. 3a and 3b, the assisted-marking input process of FIG. 7 automatically determines the endpoint of the sequence as being the minimum sequence length for a successful match (determined at step 230) after the user-marked point (determined at step 228). After step 240 indicates the end of sequence has been memorized, control then proceeds via step 242 to the appropriate process illustrated in FIG. 8 or 9 depending upon the current operating mode.

Referring now to FIG. 8, a flow chart illustrating the autonomous portion of an assisted-marking zapping function for a system and method according to the present invention is shown. The assisted-marking zapping function and the assisted-marking surfing function (illustrated in FIG. 9) are similar to the user-marked zapping and surfing functions, respectively. The difference is that the assisted-marking functions provide for automatically extending and/or trimming of the memorized sequences using the incoming information stream until the memorized sequences consist of individual, cohesive units of information. A cohesive unit describes an information segment which is always observed as a unit.

Extension of the memorized segments occurs when a terminal frame (the first or last frame) of memorized information is matched against a similar frame in the incoming information. The memorized segment is extended either forward or backward in time (if the last or first frame was matched, respectively) by memorizing additional sequential frames from the incoming information stream beginning with the frame adjacent to the matched terminal frame. Extension of the memorized segment is stopped when the chunking process (step 290) finds its segment boundaries.

Thus, steps 260 through 266 compute statistical vectors based on the incoming information stream and compare them to previously marked and memorized frames as previously described with reference to the user-marked zapping function (FIG. 4). If the information was not previously marked (i.e. the current frame does not match any of the memorized frames), step 268 buffers the statistics in a circular buffer. This computation and circular buffer may be shared between steps 222-224 of FIG. 7 and steps 262-268 of FIG. 8, since the same information is being computed and buffered in each place. This buffering of statistics allows extension of the memorized sequences backward through time as explained below. However, any gaps within the circular buffer (indicating information frames on which step 262 was not completed) will force a "fill counter" for that buffer to zero to indicate that there is a break in the data within that buffer. Furthermore, gaps of this type force an "extension counter" to zero to indicate that sequence extensions should not be continued (since the extension requires contiguous computations from step 262). The purpose of the extension counter will be discussed below.

Step 270 is illustrated with a dashed box since it is only performed when a recent successful match (one that is long enough) ended at the end of a memorized segment. This is indicated by a positive value for the extension counter which may be set by step 286 which is explained below. Thus, if the extension counter is zero, step 270 simply returns control to step 260. When the extension counter is positive, step 270 extends the memorized sequence forward in time by creating and memorizing frame identifiers using the current statistics determined at step 262. The frame is then added to the end of the memorized sequence that was last matched using an extension pointer (from step 286 explained below) to retrieve the last frame in that sequence. The extension pointer is then updated to point to the frame identifier that was just created and is now at the end of the matched memorized sequence. The extension counter is then decremented.

With continuing reference to FIG. 8, step 272 caches the starting location within the incoming information stream of the first marked frame for use, if necessary, by step 292. As indicated by a dashed box, step 274 is performed only when the start of a new match is found at the start of a memorized segment. This step is aborted before modifying any memorized information if a match does not occur at the start of the memorized data (i.e. if the first matched frame of the incoming information stream corresponds to a memorized frame which does not have a null value for the previous frame pointer). Furthermore, it is also aborted if the matched starting frame is a "boundary frame". The meaning of the term "boundary frame" is described under step 290, below. Finally, the effects of step 274 are reversed by step 294 if the match is determined to be too short by step 288.

In contrast to step 270, step 274 attempts to extend the memorized sequence backward in time. Step 274 attempts this extension only if the matching memorized frame occurs at the start of a memorized sequence, the matching frame is not a boundary frame, and the circular buffer of statistics includes valid time-contiguous statistics from the incoming information stream. When these conditions are met, the memorized sequence is extended backward in time by creating and memorizing a sequence of frame identifiers from the statistics buffered by step 268 and attaching them to the start of the previously memorized sequence. The point of attachment of the added sequence is cached so that the effects may be reversed by step 294 if necessary. Without this ability, incorrect short-sequence matches would add unrelated information onto the front of the memorized sequence. Steps 276 through 284 proceed in a manner similar to that illustrated and described with reference to steps 110 through 118 of FIG. 4.

If the end of a memorized sequence is detected at step 284, then step 286 determines whether it is appropriate to extend the memorized video forward in time (as explained with reference to step 270). If the end of the matched memorized sequence is not a boundary frame (as defined below under step 290), the memorized information should be extended forward in time. In this case, step 286 sets the extension pointer to the currently matched, memorized frame identifier, and the extension counter to the maximum extension length. This allows step 270 to extend the trailer if the other conditions for extension are met as explained above.

If the matched sequence is long enough as determined in step 288, step 290 updates the "chunking" of the memorized information. This step updates the sequencing information between the memorized frames that were matched and the memorized frames which were not matched so that the sequences contained in the memorized tables only cover pieces (chunks) of information which always occur together. The starting point of the matched sequence will form a "segment boundary" provided there was incoming information (which failed to match) immediately preceding that starting frame. In this case, the pointers which cross this segment boundary are nulled which indicates that the corresponding frame identifiers on either side of the segment boundary are "boundary frames". Similarly, the ending point of the matched sequence is updated. Thus, if memorized information follows the matched information, the pointers across this segment boundary are nulled and the frame identifiers on either side of the segment become boundary frames as well. Once the memorized sequence is divided into chunks (if necessary), only the chunk that contains the user-marked frame is retained. Other chunks are forgotten by removing all pointers to the frames in those chunks and making the memory space available to the system. In addition to assuring that the memorized tables contain only pieces of information which always occur together, this process also stops the growth outward at the boundary frames during automatic leader/trailer extension explained below.

Step 292 controls the recording device to zap the information from the recording as explained with reference to step 202 of FIG. 6. If the matched sequence is not long enough as determined by step 288, step 294 is performed. Step 294 eliminates any frames added by step 274 since the matched sequence was too short for extension. This elimination involves forgetting the leader extension by removing all pointers to the frames in that extension and making the memory space available to the system.

Figure 9:
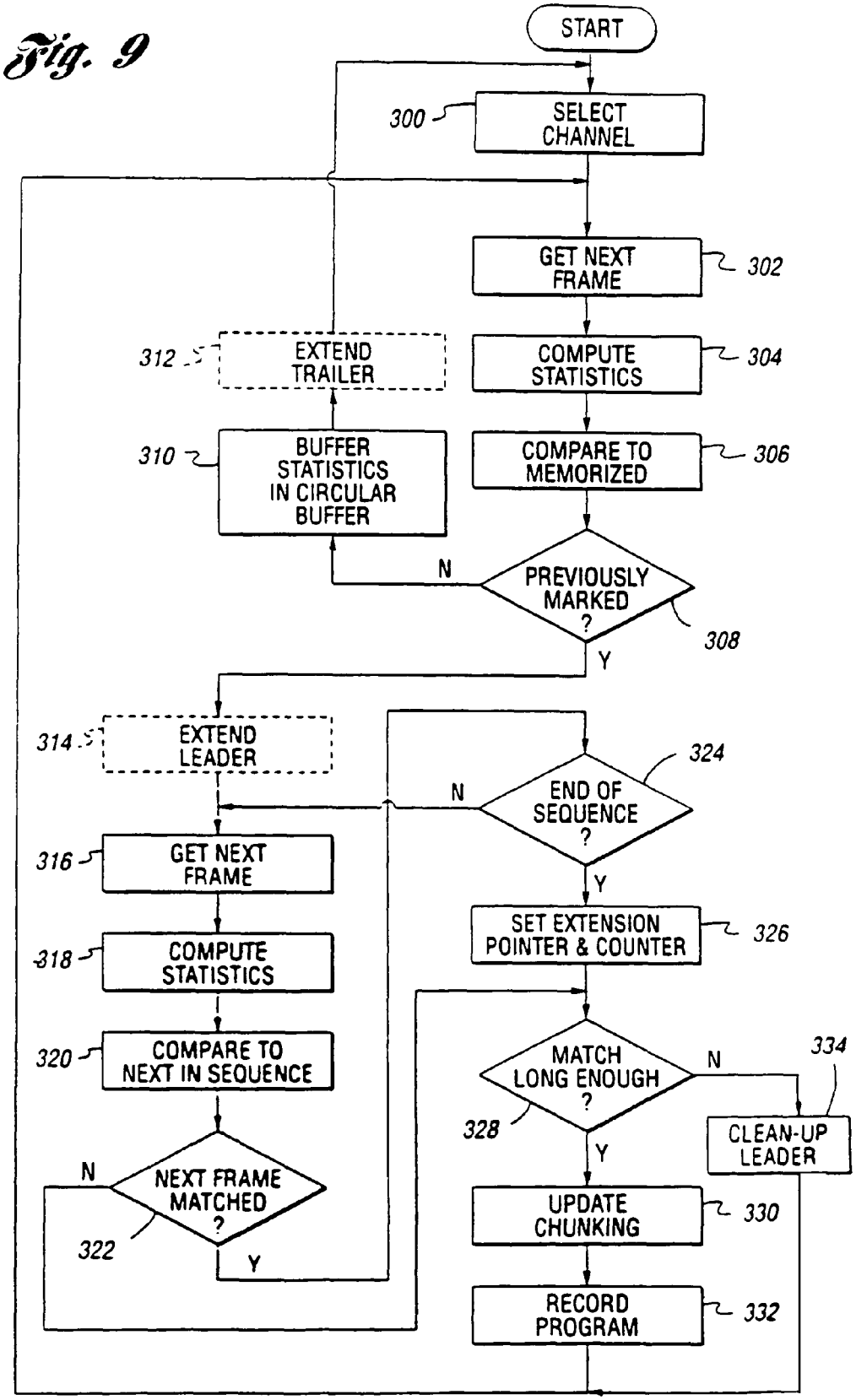
FIG. 9 is a flow chart illustrating operation of an assisted-marking surfing mode according to the present invention.

Referring now to FIG. 9, a flow chart illustrating an assisted-marking surfing function of a system and method for selective recording of information according to the present invention is shown. This function is similar to the assisted-marking zapping function illustrated in FIG. 8 and the user-marked surfing function illustrated in FIG. 5. Once information is marked by the process illustrated in FIG. 7, a channel is selected at step 300 in an attempt to locate the marked information. This channel selection process is the same as discussed for step 140 of FIG. 5.

Steps 302 through 310 continue buffering statistical vectors of incoming information frames until a frame matches a previously marked frame as determined by step 308. To avoid confounding of information segments, step 310 preferably utilizes a different buffer for each information channel. Of course, other techniques for associating an information frame with the information channel which it came from are possible. As with step 270 of FIG. 8, step 312 of FIG. 9 is performed only when all its conditions are satisfied which may occur only after step 326 has properly initialized the extension pointer and counter. Steps 314 through 330 function in a similar manner as that described with reference to steps 274 through 290 of FIG. 8. Step 332 controls a recording device to begin recording the incoming information for the time specified by the user. Step 334 performs a similar function to that described in reference to step 294 of FIG. 8 in that step 334 reverses the effects of step 314 if necessary.

Figure 10:
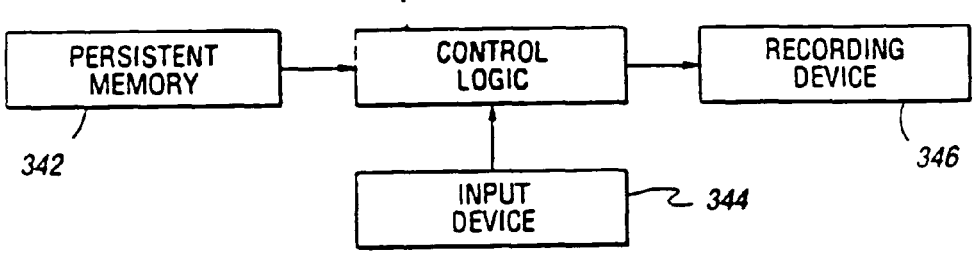
FIG. 10 is a block diagram representing a system for selective recording of information according to the present invention.

Referring now to FIG. 10, a block diagram illustrating a system for selective recording of information according to the present invention is shown. Preferably, control logic 340 is implemented by a computer programmed to effect system operation as illustrated in FIGS. 1 through 9. Of course, the system and method of the present invention may be effected with control logic implemented utilizing a number of combinations of general purpose and special purpose hardware and software, such as application-specific integrated circuits (ASICs), reduced instruction set controllers (RISCs), programmable logic arrays (PLAs), discrete components, or the like.

A persistent (non-volatile) memory 342 receives and stores incoming information and is in communication with control logic 340. Persistent memory 342 may include a significant amount of homogeneous or heterogeneous memory such as DRAM, RAM, EEPROM or the like. The preferred size and preferred computational capabilities of persistent memory 342 and control logic 340, respectively, have been described with reference to their associated functions illustrated in FIGS. 3 through 9. Input device 344 may be an integrated user interface to allow entry of instructions and selection of user-marked information, or may be a separate device, such as a remote control device. Recording device 346 is selected depending on the particular type of information desired to be recorded. In a preferred embodiment, recording device 346 is a VCR utilized to record video and/or audio information transmitted as a standard television broadcast or a compressed direct television broadcast. Recording device 346 may be an integral part of the system as shown, or may be a separate standard recording device which communicates with the control logic via a standard interface.

Thus, it is understood, that while the forms of the invention herein shown and described include the best mode contemplated for carrying out the invention, they are not intended to illustrate all possible forms thereof. It will also be understood that the words used are descriptive rather than limiting, and that various changes may be made without departing from the spirit and scope of the invention disclosed.

What is claimed is:

1. A system for controlling a recording device to effect selective recording of an incoming information stream, wherein the incoming information stream comprises multiple media frames, the system comprising:

a memory; and control logic in communication with the memory configured to:

define a segment of interest in a first information stream, wherein the segment of interest comprises multiple media frames;

modify the segment of interest by adding a selected media frame of the multiple media frames to the segment of interest or deleting a selected media frame of the multiple media frames from the segment of interest;

mark as a boundary point a media frame adjacent to a selected media frame, wherein the selected media frame is to be deleted from the segment of interest;

prevent the addition of media frames to a terminal portion of the segment of interest which has been marked by the boundary point;

generate multiple statistical vectors corresponding to individual media frames in the segment of interest;

store the generated multiple statistical vectors in the memory;

perform sequential pattern matching of the incoming information stream based on the multiple statistical vectors; and generate a signal for the recording device to effect control of the recording device with respect to the incoming information stream based on the sequential pattern matching.

2. The system of claim 1 wherein the control logic generates the statistical vectors based on a block unitary transform of at least a portion of the incoming information stream.

3. The system of claim 1 wherein the control logic is further configured to learn a sequential information pattern used to pattern match subsequent information sequences based on a statistical characterization of the sequential information pattern and the subsequent information sequences.

4. The system of claim 1 wherein the control logic comprises a programmed microprocessor.

5. The system of claim 1 wherein the incoming information stream represents video information.

6. The system of claim 1 further comprising an input device in communication with the control logic for marking incoming information.

7. The system of claim 1 wherein the control logic performs sequential pattern matching by computing a statistical vector representative of a portion of the incoming information stream, matching that first statistical vector to the stored statistical vector, computing a second statistical vector representative of the next portion of the incoming information stream, and matching that second statistical vector to a similar second stored statistical vector, wherein the first stored statistical vector identifies the second stored statistical vector.

8. A method for controlling a recording device to effect selective recording of an incoming information stream, wherein the incoming information stream comprises multiple information frames, the method comprising:

defining a segment of interest in the incoming information stream, wherein the segment of interest comprises multiple information frames;

modifying the segment of interest by adding a selected media frame of the multiple media frames to the segment of interest or deleting a selected media frame of the multiple media frames from the segment of interest;

marking mark as a boundary point a media frame adjacent to a selected media frame, wherein the selected media frame is to be deleted from the segment of interest;

preventing the addition of media frames to a terminal portion of the segment of interest which has been marked by the boundary point;

generating statistical vectors corresponding to individual information frames in the segment of interest;

storing the generated statistical vectors;

performing sequential pattern matching of the incoming information stream to the stored statistical vectors; and generating, and outputting to the recording device, a signal based on the sequential pattern matching for the recording device to effect control of the recording device with respect to the incoming information stream.

9. The method of claim 8 wherein generating the statistical vectors comprises representing the individual information frames using summary statistics.

10. The method of claim 8 wherein generating the statistical vectors comprises representing the individual information frames using a block unitary transform.

11. The method of claim 8 wherein storing the generated statistical vectors comprises:

storing the generated statistical vectors in an indexable table.

12. The method of claim 11, further comprising automatically extending the segment of interest based on a matching portion of the incoming information stream.

* * * * *

UNITED STATES PATENT AND TRADEMARK OFFICE
CERTIFICATE OF CORRECTION

| | | |
|---|---|---|
| PATENT NO. | : 7,849,475 B2 | Page 1 of 1 |
| APPLICATION NO. | : 10/888800 | |
| DATED | : December 7, 2010 | |
| INVENTOR(S) | : Michele Mae Covell et al. | |

It is certified that error appears in the above-identified patent and that said Letters Patent is hereby corrected as shown below:

In column 2, line 64, delete "fades;" and insert -- fades, --, therefor.

Signed and Sealed this
Twenty-second Day of February, 2011

David J. Kappos
*Director of the United States Patent and Trademark Office*